United States Patent
Jin et al.

(10) Patent No.: US 11,751,271 B2
(45) Date of Patent: Sep. 5, 2023

(54) METHOD AND DEVICE FOR RE-ESTABLISHING PDCP IN WIRELESS COMMUNICATION SYSTEM

(71) Applicant: Samsung Electronics Co., Ltd., Suwon-si (KR)

(72) Inventors: Seungri Jin, Suwon-si (KR); Alexander Sayenko, Seoul (KR); Soenghun Kim, Suwon-si (KR); Donggun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/715,839

(22) Filed: Apr. 7, 2022

(65) Prior Publication Data
US 2022/0232657 A1   Jul. 21, 2022

Related U.S. Application Data

(63) Continuation of application No. 16/638,085, filed as application No. PCT/KR2018/009121 on Aug. 9, 2018.

(30) Foreign Application Priority Data

Aug. 10, 2017   (KR) .................. 10-2017-0101945

(51) Int. Cl.
*H04W 76/19*   (2018.01)
*H04W 76/27*   (2018.01)
(Continued)

(52) U.S. Cl.
CPC ........... *H04W 76/19* (2018.02); *H04W 36/08* (2013.01); *H04W 76/27* (2018.02); *H04W 80/08* (2013.01)

(58) Field of Classification Search
CPC . H04W 72/1268; H04W 4/70; H04W 52/262; H04W 74/004; H04W 74/0833
See application file for complete search history.

(56) References Cited

U.S. PATENT DOCUMENTS

2015/0215965 A1*   7/2015   Yamada ................ H04W 76/27
                                                                370/329
2015/0373559 A1   12/2015   Hong
(Continued)

FOREIGN PATENT DOCUMENTS

CN   105075314 A   11/2015
CN   105103610 A   11/2015
(Continued)

OTHER PUBLICATIONS

ISA/KR, International Search Report and Written Opinion of the International Searching Authority, International Application No. PCT/KR2018/009121, dated Nov. 12, 2018, 11 pages.
(Continued)

*Primary Examiner* — Basil Ma

(57) ABSTRACT

Disclosed are a communication technique for merging IoT technology with a 5G communication system for supporting a data transmission rate higher than that of a 4G system and a system therefor. The present disclosure can be applied to intelligent services (for example, smart home, smart building, smart city, smart car or connected car, healthcare, digital education, retail, security, and safety related services, and the like) on the basis of 5G communication technology and IoT-related technology. The present invention relates to operations of a terminal and a base station in a mobile communication system. The present invention provides a method by which a terminal re-establishes a PDCP in a wireless communication system, the method comprising the steps of: receiving a message including PDCP re-establishment information on a DRB from a base station in which an
(Continued)

RRC connection is set up; checking whether the PDCP re-establishment information includes configuration information of an SDAP layer; and determining whether to perform a PDCP re-establishment procedure for changing the DRB operating as a PDCP of a first system into a PDCP of a second system on the basis of the checking result.

12 Claims, 21 Drawing Sheets

(51) Int. Cl.
*H04W 36/08* (2009.01)
*H04W 80/08* (2009.01)

(56) References Cited

U.S. PATENT DOCUMENTS

| | | | |
|---|---|---|---|
| 2016/0014647 | A1 | 1/2016 | Yi et al. |
| 2016/0044639 | A1 | 2/2016 | Yi et al. |
| 2016/0066241 | A1 | 3/2016 | Wu et al. |
| 2016/0269945 | A1 | 9/2016 | Jang |
| 2016/0286449 | A1* | 9/2016 | Choi .................... H04W 36/04 |
| 2017/0064693 | A1 | 3/2017 | Kim et al. |
| 2017/0215225 | A1 | 7/2017 | Yi et al. |
| 2017/0332419 | A1 | 11/2017 | Kim et al. |
| 2019/0028920 | A1 | 1/2019 | Pan |
| 2019/0037634 | A1* | 1/2019 | Kadiri .............. H04W 74/0833 |
| 2019/0053098 | A1 | 2/2019 | Jo et al. |
| 2020/0374961 | A1 | 11/2020 | Ingale et al. |
| 2022/0167451 | A1* | 5/2022 | Bergström ............ H04W 76/34 |
| 2022/0264686 | A1* | 8/2022 | Tsai ...................... H04W 76/19 |

FOREIGN PATENT DOCUMENTS

| | | |
|---|---|---|
| CN | 105230077 A | 1/2016 |
| CN | 105979601 A | 9/2016 |
| CN | 105992285 A | 10/2016 |
| GB | 201621072 | 1/2017 |
| GB | 2559840 A | 8/2018 |
| KR | 10-2015-0137064 A | 12/2015 |
| KR | 10-2017-0023723 A | 3/2017 |
| KR | 10-2017-0041658 A | 4/2017 |
| WO | 2014163309 A1 | 10/2014 |
| WO | 2016056869 A1 | 4/2016 |
| WO | 2016159731 A1 | 10/2016 |
| WO | 10-2017-196126 A1 | 11/2017 |

OTHER PUBLICATIONS

Korean Intellectual Property Office (KIPO), "Office Action" dated Jun. 25, 2021, in connection with counterpart Korean Patent Application No. 10-2017-0101945, 8 pages.
Decision of Patent dated Dec. 21, 2021, in connection with Korean Application No. 10-2017-0101945, 4 pages.
Ericsson, "RRC procedure and signaling for harmonized bearers," R2-1706571, 3GPP TSG RAN WG2#NR_AdHoc#2, Qingdao, China, Jun. 27-29, 2017, 7 pages.
Ericsson, "Nr RRCConnectionReconfiguration procedure and signalling baseline," Tdoc R2-1707201, 3GPP TSG-RAN WG2 #NR2, Qingdao, P.R. of China, Jun. 27-29, 2017, 10 pages.
Huawei, et al., "Support of NR Intra-cell handover," R2-1704846, 3GPP TSG-RAN WG2 #98, Hangzhou, China, May 15-19, 2017, 2 pages.
Huawei, et al., "PDCP reordering disabling and enabling," R2-1707252 Update of R2-1704618, 3GPP TSG RAN WG2#NR_AdHoc#2, Qingdao, China, Jun. 27-29, 2017, 3 pages.
Zte, et al., "Consideration on the bearer type harmonization," R2-1706980, 3GPP TSG RAN WG2#NR_AdHoc#2, Qingdao, China, Jun. 27-29, 2017, 36 pages.
European Patent Office, "Communication pursuant to Article 94(3) EPC," dated Mar. 22, 2023, in connection with European Patent Application No. 1884633.0, 8 pages.
China National Intellectual Property Administration, "The First Office Action," dated Jan. 19, 2023, in connection with Korean Patent Application No. 201880051898.1, 16 pages.
3GPP TS 36.331 v14.3.0 (Jun. 2017) Technical Specification; "3rd Generation Partnership Project; Technical Specification Group Radio Access Network; Evolved Universal Terrestrial Radio Access (E-UTRA); Radio Resource Control (RRC); Protocol specification (Release 14)"; 745 pages.
China National Intellectual Property Administration (CNIPA), "Notification of a Decision to Grant a Patent," dated Jun. 29, 2023, in connection with counterpart Chinese Application No. 201880051898.1, 10 pages.
NTT Docomo, Inc., "Introduction of user inactivity timer," 3GPP TSG-RAN WG2 Meeting #97 R2-1701547, Athens, Greece, Feb. 13-17, 2017, 58 pages.

* cited by examiner

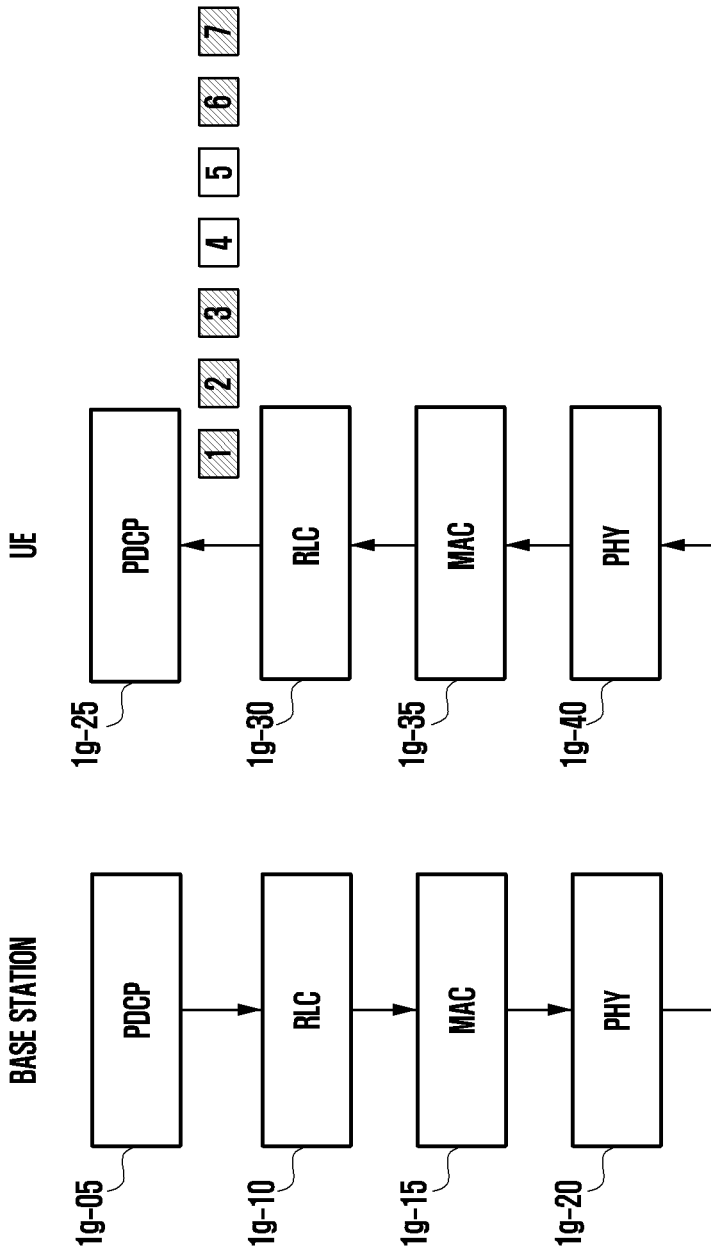

METHOD AND DEVICE FOR RE-ESTABLISHING PDCP IN WIRELESS COMMUNICATION SYSTEM

CROSS-REFERENCE TO RELATED APPLICATIONS

This application is a continuation of application Ser. No. 16/638,085 which is the 371 National Stage of International Application No. PCT/KR2018/009121, filed Aug. 9, 2018, which claims priority to Korean Patent Application No. 10-2017-0101945, filed Aug. 10, 2017, the disclosures of which are herein incorporated by reference in their entirety.

BACKGROUND

1. Field

The disclosure relates to a re-establishment method and device based on a version change of a PDCP in a mobile communication system.

Furthermore, the disclosure relates to a method and device for a terminal to perform carrier aggregation activation without a delay upon transition from an inactive state to a connected state in a next-generation mobile communication system.

2. Description of Related Art

In order to satisfy wireless data traffic demands that tend to increase after 4G communication system commercialization, efforts to develop an enhanced 5G communication system or a pre-5G communication system are being made. For this reason, the 5G communication system or pre-5G communication system is called a beyond 4G network communication system or a post LTE system.

In order to achieve a high data transfer rate, the 5G communication system is considered to be implemented in a mmWave band (e.g., 60 GHz band). In order to reduce a loss of electric waves and increase the transfer distance of electric waves in the mmWave band, beamforming, massive MIMO, full dimensional MIMO (FD-MIMO), array antenna, analog beamforming and large scale antenna technologies are being discussed in the 5G communication system.

Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP) and reception interference cancellation, are being developed in the 5G communication system. In addition, hybrid FSK and QAM modulation (FQAM) and sliding window superposition coding (SWSC) that are advanced coding modulation (ACM) schemes, improved filter bank multi-carrier (FBMC), non-quadrature multiple access (NOMA) and sparse code multiple access (SCMA) are being developed in the 5G system.

In the 5G system, the support of various services for the existing 4G system is taken into consideration. For example, most representative services may include enhanced mobile broad band (eMBB), ultra-reliable and low latency communication (URLLC), massive machine type communication (mMTC), evolved multimedia broadcast/multicast service (eMBMS), etc. Furthermore, a system providing the URLLC service may be called a URLLC system, and a system providing the eMBB service may be called an eMBB system. Furthermore, terms, such as service and system, may be interchangeably used.

From among the services, the URLLC service is newly taken into consideration in the 5G system unlike the existing 4G system and requires the satisfaction of ultra-high reliability (e.g., a packet error rate of about 10-5) and low latency (e.g., about 0.5 msec) conditions, compared to other services. In order to satisfy such strict requirements, the URLLC service may need to apply a short transmission time interval (TTI) compared to the eMBB service. Various operation methods using the TTI are taken into consideration.

The Internet evolves from a human-centered connection network over which human generates and consumes information to Internet of Things (IoT) in which information is exchanged and process between distributed elements, such as things. An Internet of Everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, 5G communication technologies, such as a sensor network, machine to machine (M2M) and machine type communication (MTC), are implemented by schemes, such as beamforming, MIMO, and an array antenna. The application of a cloud wireless access network (cloud RAN) as the aforementioned big data processing technology may be said to be an example of convergence between the 5G technology and the IoT technology.

SUMMARY

The disclosure provides an operation in a bearer change when a handover or sequence number change operation occurs in the dual connectivity of LTE and NR newly introduced in a next-generation mobile communication system. In particular, the disclosure provides a change operation from an LTE PDCP to an NR PDCP through a PDCP re-establishment operation if a PDCP version change of the bearer changes is necessary and a related operation thereof.

Furthermore, in a next-generation mobile communication system, in order to provide service having a high data transfer rate and low transmission latency, a base station needs to rapidly configure a carrier aggregation (CA) technology or a dual connectivity (DC) technology in a terminal. In particular, upon transition from an inactive state to a connected state, if such transition operates similar to the existing transition from an idle state to a connected state, a lot of time is taken to newly establish a connection and activate a carrier aggregation. Accordingly, the disclosure proposes a method and device for a terminal to perform carrier aggregation activation without a delay upon transition from an inactive state to a connected state.

Technical objects to be achieved in the disclosure are not limited to the aforementioned technical objects, and other technical objects not described above may be evidently understood by a person having ordinary skill in the art to which the disclosure pertains from the following description.

The disclosure provides a method for a terminal to re-establish a packet data convergence protocol (PDCP) in a wireless communication system, including receiving, from a base station, a message including PDCP re-establishment information for a data radio bearer (DRB), the base station configured a radio resource control (RRC) connection, identifying whether configuration information for a service data adaptation protocol (SDAP) layer is included in the PDCP re-establishment information, and determining whether to perform a PDCP re-establishment procedure for changing the DRB, operating as a PDCP of a first system, into a PDCP of a second system based on a result of the identification.

Furthermore, the disclosure provides a terminal re-establishing a packet data convergence protocol (PDCP) in a wireless communication system, including a transceiver transmitting and receiving signals and a controller configured to receive, via the transceiver from a base station, a message including PDCP re-establishment information for a data radio bearer (DRB), the base station configured a radio resource control (RRC) connection, identify whether configuration information for a service data adaptation protocol (SDAP) layer is included in the PDCP re-establishment information, and determine whether to perform a PDCP re-establishment procedure of changing the DRB, operating as a PDCP of a first system, into a PDCP of a second system based on a result of the identification.

Furthermore, the disclosure provides a method for a base station to change a radio resource control (RRC) state, including determining a secondary cell in which a cell configuration with a terminal is maintained and transmitting, to the terminal, a control message information on the secondary cell. In the RRC inactive state of the terminal, the cell configuration between the terminal and the secondary cell is maintained.

Furthermore, in the method, the control message may be a message, including a first SCell list indicative of the secondary cell and indicating the transition of the terminal to the RRC inactive state.

Furthermore, in the method, the control message may be an RRC connection resume message including a second SCell list indicative of the secondary cell.

Furthermore, in the method, an RF synchronization and tuning operation may be performed on the secondary cell by the terminal.

Furthermore, in the method, the secondary cell may be a secondary cell present within a base station with which an RRC connection with the terminal has been established or a secondary cell within a base station present within a RAN paging area.

Furthermore, the method may further include transmitting, to the terminal, a message to activate a carrier aggregation (CA) with respect to a cell in which the secondary cell configuration is maintained.

Furthermore, in the method, the message to activate a carrier aggregation (CA) may include a third SCell list indicative of at least one of the secondary cells, and may be a medium access control (MAC) control element (CE).

Furthermore, the disclosure provides a method for a terminal to change a radio resource control (RRC) state, including identifying whether information on a secondary cell with which a cell configuration is to be maintained is included in a control message received from a base station, determining whether to maintain the cell configuration of the secondary cell in the RRC inactive state based on a result of the identification, and maintaining the cell configuration determined in determining whether to maintain the cell configuration.

Furthermore, in the method, identifying whether information on a secondary cell with which a cell configuration is to be maintained is included may further include identifying whether the control message is a message to indicate the transition of the terminal to the RRC inactive state and identifying whether a first SCell list indicative of a secondary cell is included in the information.

Furthermore, in the method, identifying whether information on a secondary cell with which a cell configuration is to be maintained is included may further include identifying whether the control message is an RRC connection resume message and identifying whether a second SCell list indicative of a secondary cell is included in the information.

Furthermore, in the method, determining whether to maintain the cell configuration may further include determining whether to maintain the cell configuration based on the most recently received information if a plurality of pieces of information for a secondary cell with which a cell configuration is to be maintained is identified.

Furthermore, in the method, maintaining the cell configuration may further include maintaining and tuning RF synchronization for the secondary cell.

Furthermore, in the method, the information on the secondary cell may be information on a secondary cell present within the base station or a secondary cell within a base station present within a RAN paging area.

Furthermore, the method may further include receiving, from the base station, a message to activate a carrier aggregation (CA) with respect to a secondary cell in which the cell configuration is maintained, and performing CA activation.

Furthermore, in the method, the message to activate a carrier aggregation (CA) may include a third SCell list indicative of at least one of the secondary cells, and may be transmitted through a medium access control (MAC) control element (CE).

Furthermore, the disclosure provides a base station, including a transceiver transmitting and receiving signals and a controller configured to determine a secondary cell in which a cell configuration with a terminal is maintained and transmit, to the terminal, a control message information on the secondary cell. In the RRC inactive state of the terminal, the cell configuration between the terminal and the secondary cell is maintained.

Furthermore, in the base station, the control message may be a message, including a first SCell list indicative of the secondary cell and indicating the transition of the terminal to the RRC inactive state.

Furthermore, in the base station, the control message may be an RRC connection resume message including a second SCell list indicative of the secondary cell.

Furthermore, in the base station, an RF synchronization and tuning operation may be performed on the secondary cell by the terminal.

Furthermore, in the base station, the secondary cell may be a secondary cell present within a base station with which an RRC connection with the terminal has been established or a secondary cell within a base station present within a RAN paging area.

Furthermore, in the base station, the controller may be further configured to transmit, to the terminal, a message to activate a carrier aggregation (CA) with respect to a cell in which the secondary cell configuration is maintained.

Furthermore, in the base station, the message to activate a carrier aggregation (CA) may include a third SCell list indicative of at least one of the secondary cells, and may be a medium access control (MAC) control element (CE).

Furthermore, the disclosure provides a terminal, including a transceiver transmitting and receiving signals and a controller configured to identify whether information on a secondary cell with which a cell configuration is to be maintained is included in a control message received from a base station, to determine whether to maintain the cell configuration of the secondary cell in the RRC inactive state based on a result of the identification, and to maintain the cell configuration determined in determining whether to maintain the cell configuration.

Furthermore, in the terminal, the controller may be further configured to identify whether the control message is a message to indicate the transition of the terminal to the RRC inactive state and to identify whether a first SCell list indicative of a secondary cell is included in the information.

Furthermore, in the terminal, the controller may be further configured to identify whether the control message is an RRC connection resume message and to identify whether a second SCell list indicative of a secondary cell is included in the information.

Furthermore, in the terminal, the controller may be further configured to determine whether to maintain the cell configuration based on the most recently received information if a plurality of pieces of information for a secondary cell with which a cell configuration is to be maintained is identified.

Furthermore, in the terminal, the controller may be further configured to maintain and tuning RF synchronization for the secondary cell.

Furthermore, in the terminal, the information on the secondary cell may be information on a secondary cell present within the base station or a secondary cell within a base station present within a RAN paging area.

Furthermore, in the terminal, the controller may be further configured to receive, from the base station, a message to activate a carrier aggregation (CA) with respect to a secondary cell in which the cell configuration is maintained, and to perform CA activation.

Furthermore, in the terminal, the message to activate a carrier aggregation (CA) may include a third SCell list indicative of at least one of the secondary cells, and may be transmitted through a medium access control (MAC) control element (CE).

Advantageous Effects of Invention

In the disclosure, a change operation from an LTE PDCP to an NR PDCP can be optimized by embodying a method of minimizing a PDCP re-establishment operation, in particular, a loss of data attributable to a PDCP version change between LTE and NR in a next-generation mobile communication system.

In the disclosure, a terminal can rapidly perform carrier aggregation activation when it switches to a connected state because a base station properly provides configuration information when the terminal enters an inactive state in a next-generation mobile communication system.

Effects which may be obtained in the disclosure are not limited to the aforementioned effects, and other technical effects not described above may be evidently understood by a person having ordinary skill in the art to which the disclosure pertains from the following description.

BRIEF DESCRIPTION OF THE DRAWINGS

FIG. 1G is a diagram illustrating an example of a second PDCP re-establishment pre-operation, which is considered in the disclosure.

FIG. 2HB is a diagram illustrating the entire operation of a UE to which the disclosure is applied.

DETAILED DESCRIPTION

Hereinafter, an operation principle of the disclosure is described in detail with reference to the accompanying drawings. In describing the disclosure, a detailed description of a related known function or configuration will be omitted if it is deemed to make the gist of the disclosure unnecessarily vague. Furthermore, terms to be described hereunder have been defined by taking into consideration functions in the disclosure, and may be different depending on a user, an operator's intention or practice. Accordingly, each term should be defined based on contents over the entire specification.

Hereinafter, in the disclosure, terms and names defined in 3rd generation partnership project long term evolution (3GPP LTE) standards or terms and names modified based on the 3GPP LTE standards are used, for convenience of description. However, the disclosure is not restricted by the terms and names, and may be identically applied to systems complying with other standards.

Embodiment 1

Figure 1A:
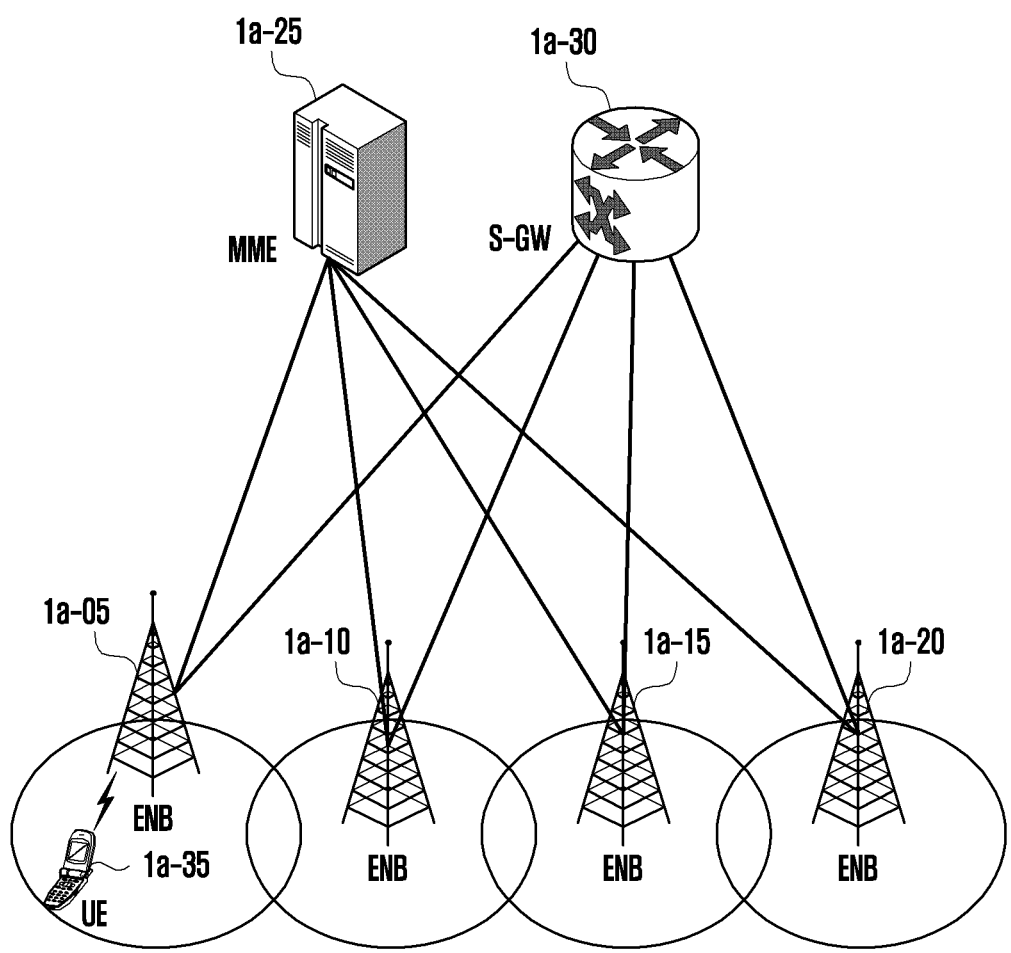
FIG. 1A is a diagram illustrating the architecture of an LTE system to which reference is made for the description of the disclosure.

FIG. 1A is a diagram illustrating the architecture of an LTE system to which reference is made for the description of the disclosure.

Referring to FIG. 1A, as illustrated, the radio access network of the LTE system includes next-generation evolved Node Bs (hereinafter referred to as "eNBs", "Node Bs" or "base stations") 1a-05, 1a-10, 1a-15, and 1a-20, a mobility management entity (MME) 1a-25, and a serving-gateway (S-GW) 1a-30. A user equipment (hereinafter referred to as a "UE" or "terminal") 1a-35 accesses an external network through the eNBs 1a-05~1a-20 and the S-GW 1a-30.

In FIG. 1A, the eNBs 1a-05~1a-20 correspond to the Node Bs of the existing UMTS system. The eNB is connected to the UE 1a-35 through a radio channel and performs a more complex function than the existing Node B. In the LTE system, all of types of user traffic including a real-time service, such as voice over IP (VoIP), through the Internet protocol, are served through a shared channel. Accordingly, a device that performs schedules by collecting state information, such as the buffer state, available transmission power state, and channel state of UEs, is necessary. The eNBs 1a-05~1a-20 are in charge of such a device. In general, one eNB controls multiple cells. For example, in order to implement the transfer rate of 100 Mbps, the LTE system uses orthogonal frequency division multiplexing (hereinafter referred to as "OFDM") as a radio access technology in the 20 MHz bandwidth, for example. Furthermore, the LTE system adopts an adaptive modulation & coding (hereinafter referred to as "AMC") scheme for determining a modulation scheme and a channel coding rate based on the channel state of a UE. The S-GW 1a-30 provides a data bearer and generates or removes a data bearer under the control of the MME 1a-25. The MME is in charge of various control functions in addition to a mobility management function for a UE, and is connected to multiple base stations.

Figure 1B:
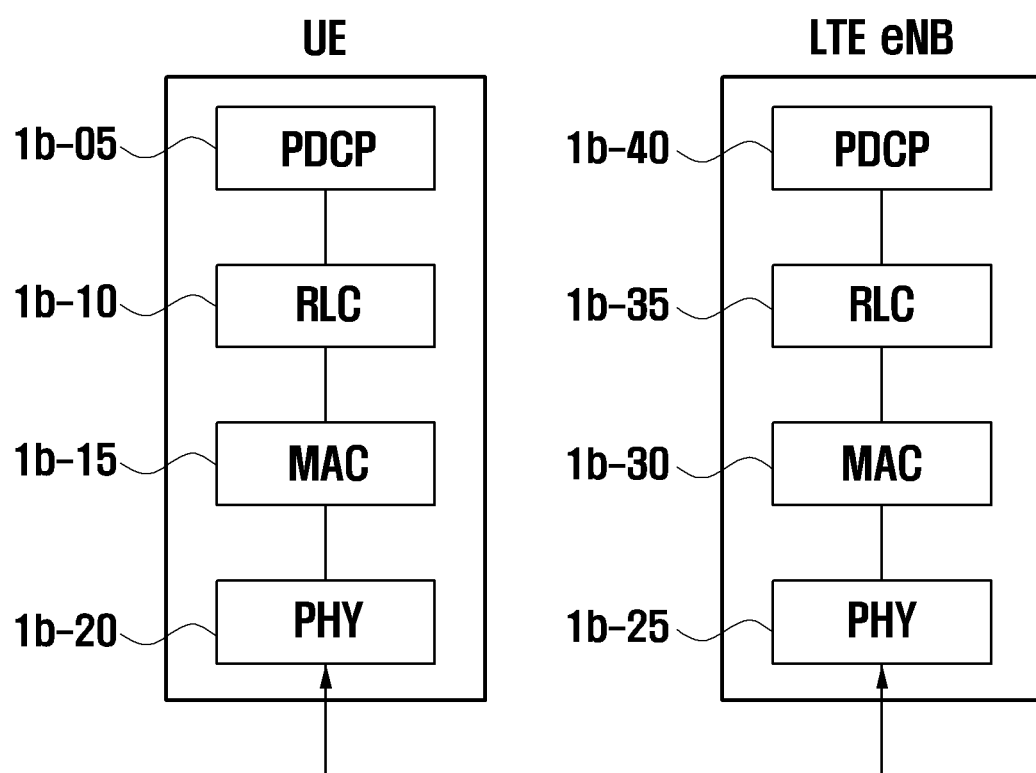
FIG. 1B is a diagram illustrating a radio protocol structure in an LTE system to which reference is made for the description of the disclosure.

FIG. 1B is a diagram illustrating a radio protocol structure in an LTE system to which reference is made for the description of the disclosure.

Referring to FIG. 1B, the radio protocol of the LTE system includes packet data convergence protocols (PDCPs) 1b-05 and 1b-40, radio link control (RLC) 1b-10 and 1b-35, and medium access control (MAC) 1b-15 and 1b-30 in a UE and an eNB, respectively. The PDCPs 1b-05 and 1b-40 are in charge of an operation, such as IP header compression/restoration. Major functions of the PDCP 1b-05, 1b-40 are summarized as follows.

Header compression and decompression function (Header compression and decompression: ROHC only)
User data transfer function (Transfer of user data)
In-sequence delivery function (In-sequence delivery of upper layer PDUs at PDCP re-establishment procedure for RLC AM)
Sequence reordering function (For split bearers in DC (only support for RLC AM): PDCP PDU routing for transmission and PDCP PDU reordering for reception)
Duplicate detection function (Duplicate detection of lower layer SDUs at PDCP re-establishment procedure for RLC AM)
Retransmission function (Retransmission of PDCP SDUs at handover and, for split bearers in DC, of PDCP PDUs at PDCP data-recovery procedure, for RLC AM)
Ciphering and deciphering function (Ciphering and deciphering)
Timer-based SDU deletion function (Timer-based SDU discard in uplink.)

The RLC 1b-10, 1b-35 reconfigures a PDCP packet data unit (PDU) in a proper size and performs an ARQ operation. Major functions of the RLC are summarized as follows.

Data transfer function (Transfer of upper layer PDUs)
ARQ function (Error Correction through ARQ (only for AM data transfer))
Concatenation, segmentation and reassembly function (Concatenation, segmentation and reassembly of RLC SDUs (only for UM and AM data transfer))
Re-segmentation function (Re-segmentation of RLC data PDUs (only for AM data transfer))
Sequence reordering function (Reordering of RLC data PDUs (only for UM and AM data transfer))
Duplicate detection function (Duplicate detection (only for UM and AM data transfer))
Error detection function (Protocol error detection (only for AM data transfer))
RLC SDU discard function (RLC SDU discard (only for UM and AM data transfer))
RLC re-establishment function (RLC re-establishment)

The MAC 1b-15, 1b-30 is connected to multiple RLC layer devices configured in one UE, and performs an operation of multiplexing RLC PDUs with a MAC PDU and demultiplexing RLC PDUs from a MAC PDU. Major functions of the MAC are summarized as follows.

Mapping function (Mapping between logical channels and transport channels)
Multiplexing and demultiplexing function (Multiplexing/demultiplexing of MAC SDUs belonging to one or different logical channels into/from transport blocks (TB) delivered to/from the physical layer on transport channels)
Scheduling information report function (Scheduling information reporting)
HARQ function (Error correction through HARQ)
Priority handling function between logical channels (Priority handling between logical channels of one UE)
Priority handling function between UEs (Priority handling between UEs by means of dynamic scheduling)
MBMS service identification function (MBMS service identification)
Transport format selection function (Transport format selection)
Padding function (Padding)

A physical layer (PHY) 1b-20, 1b-25 performs an operation of channel-coding and modulating higher layer data, generating the higher layer data into an OFDM symbol, and transmitting the OFDM symbol through a radio channel or demodulating an OFDM symbol received through a radio channel, channel-decoding the OFDM symbol, and transmitting the OPDM symbol to a higher layer.

Figure 1C:
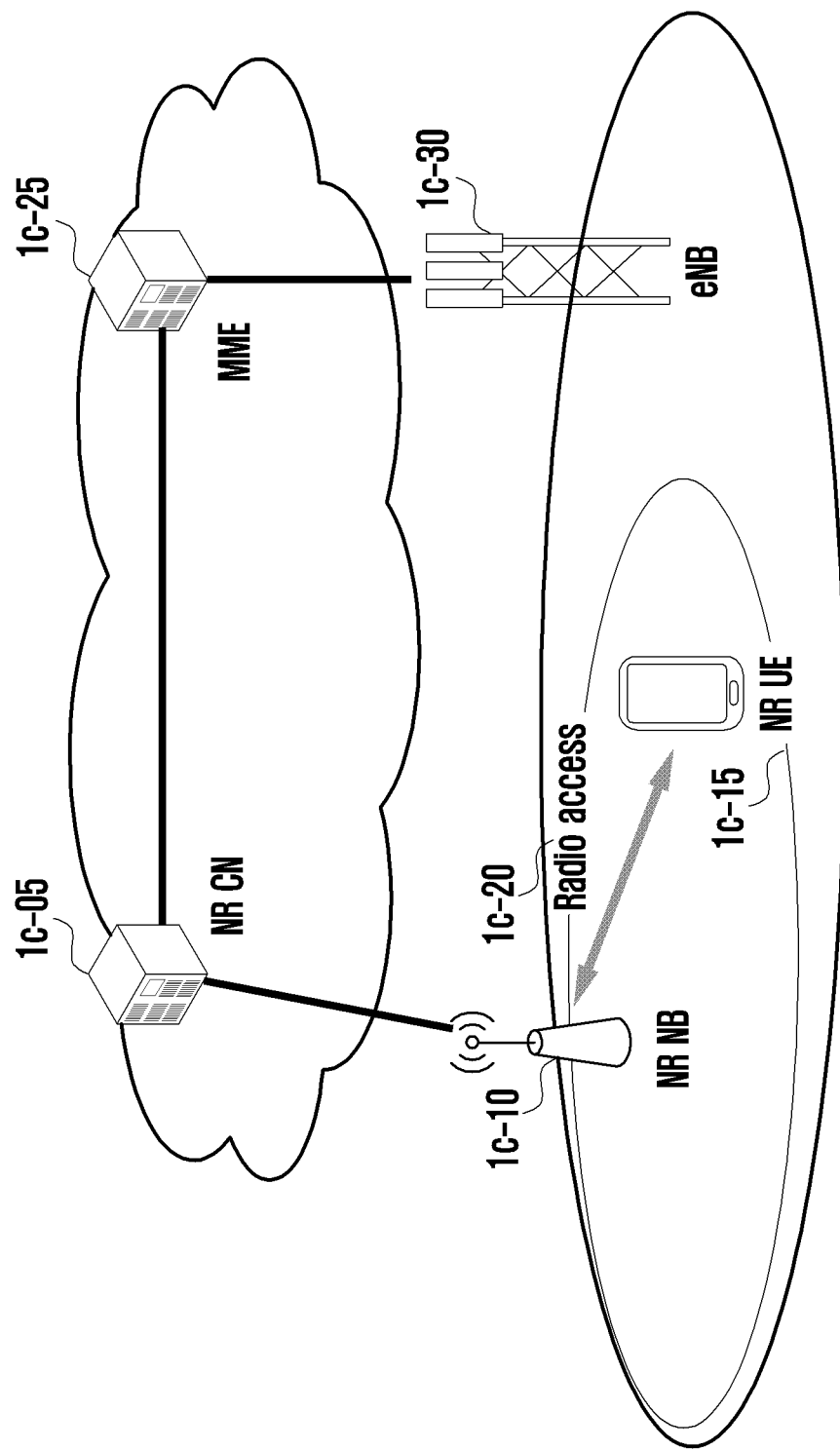
FIG. 1C is a diagram illustrating the architecture of a next-generation mobile communication system to which the disclosure is applied.

FIG. 1C is a diagram illustrating the architecture of a next-generation mobile communication system to which the disclosure is applied.

Referring to FIG. 1C, the radio access network of a next-generation mobile communication system is configured with a new radio Node B (hereinafter referred to as an "NR NB" or "NR gNB") 1c-10 and a new radio core network (NR CN) 1c-05. A new radio user equipment (hereinafter referred to as an "NR UE" or a "terminal") 1c-15 accesses an external network through the NR gNB 1c-10 and the NR CN 1c-05.

In FIG. 1C, the NR gNB 1c-10 corresponds to an evolved Node B (eNB) in the existing LTE system. The NR gNB is connected to the NR UE 1c-15 through a radio channel, and may provide an excellent service compared to the existing Node B. A next-generation mobile communication system requires a device for performing scheduling by collecting state information, such as the buffer state, available transmission power state, and channel state of UEs, because all of types of user traffic are served through a shared channel. The NR gNB 1c-10 is in charge of the device. In general, one NR gNB controls multiple cells. In order to implement ultra-high speed data transfer compared to the existing LTE, the next-generation mobile communication system may have the existing maximum bandwidth or more, and the beamforming technology may be additionally grafted using orthogonal frequency division multiplexing (hereinafter referred to as "OFDM") as a radio access technology. Furthermore, the next-generation mobile communication system adopts an adaptive modulation & coding (hereinafter referred to as "AMC") scheme of determining a modulation scheme and channel coding rate based on the channel state of a UE. The NR CN 1c-05 performs functions, such as mobility support, a bearer setup, and a QoS configuration. The NR CN 1c-05 is in charge of various control functions in addition to a mobility management function for a UE, and is connected to multiple base stations. Furthermore, the next-generation mobile communication system may also operate in conjunction with the existing LTE system. The NR CN is connected to an MME 1c-25 through a network interface. The MME is connected to an eNB 1c-30, that is, the existing base station.

Hereinafter, an LTE system may be called a first system, and a next-generation mobile communication system may be called a second system.

Figure 1D:
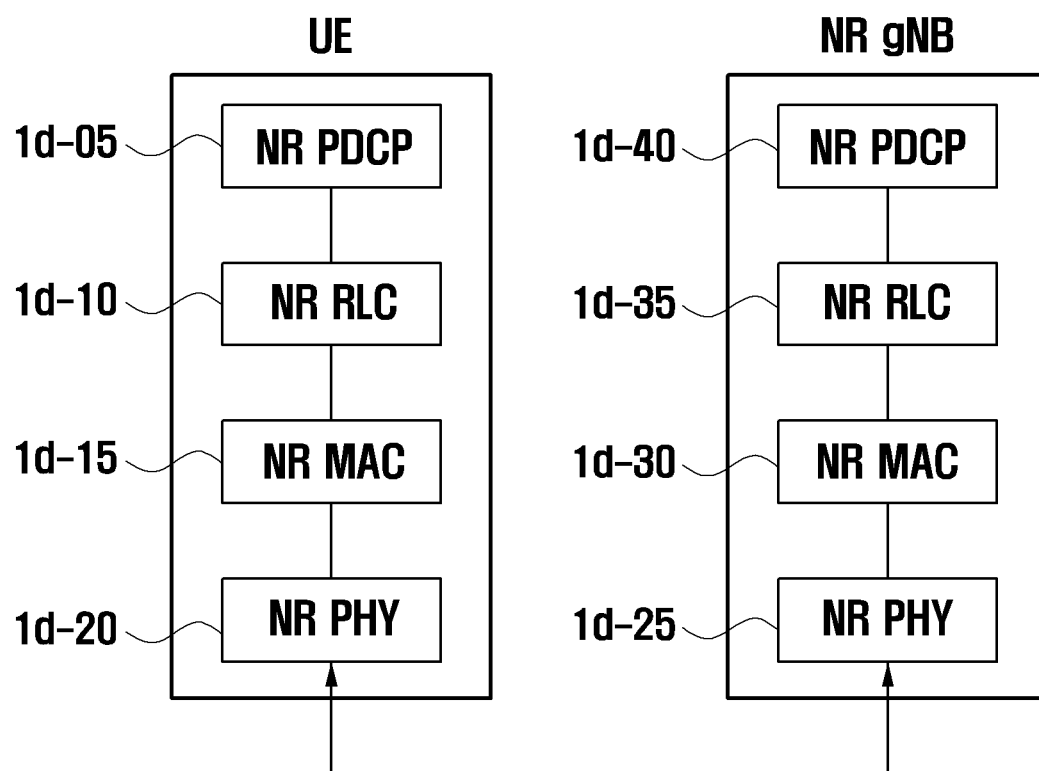
FIG. 1D is a diagram illustrating the radio protocol structure of a next-generation mobile communication system to which the disclosure may be applied.

FIG. 1D is a diagram illustrating the radio protocol structure of a next-generation mobile communication system to which the disclosure may be applied.

Referring to FIG. 1D, the radio protocol of the next-generation mobile communication system is configured with NR PDCPs 1d-05 and 1d-40, NR RLC 1d-10 and 1d-35, and NR MAC 1d-15 and 1d-30 in a UE and an NR base station, respectively. Major functions of the NR PDCP 1d-05, 1d-40 may include some of the following functions.

- Header compression and decompression function (Header compression and decompression: ROHC only)
- User data transfer function (Transfer of user data)
- In-sequence delivery function (In-sequence delivery of upper layer PDUs)
- Sequence reordering function (PDCP PDU reordering for reception)
- Duplicate detection function (Duplicate detection of lower layer SDUs)
- Retransmission function (Retransmission of PDCP SDUs)
- Ciphering and deciphering function (Ciphering and deciphering)
- Timer-based SDU deletion function (Timer-based SDU discard in uplink.)

In the above description, the reordering function (reordering) of an NR PDCP entity refers to a function of sequentially reordering PDCP PDUs, received from a lower layer, based on a PDCP sequence number (SN), may include a function of delivering data to a higher layer in a reordered sequence, may include a function of recording lost PDCP PDUs by reordering the sequence, may include a function of making a status report on lost PDCP PDUs to the transmission side, and may include a function of requesting the retransmission of lost PDCP PDUs.

Major functions of the NR RLC 1d-10, 1d-35 may include some of the following functions.

- Data transfer function (Transfer of upper layer PDUs)
- In-sequence delivery function (In-sequence delivery of upper layer PDUs)
- Out-of-sequence delivery function (Out-of-sequence delivery of upper layer PDUs)
- ARQ function (Error Correction through ARQ)
- Concatenation, segmentation and reassembly function (Concatenation, segmentation and reassembly of RLC SDUs)
- Re-segmentation function (Re-segmentation of RLC data PDUs)
- Sequence reordering function (Reordering of RLC data PDUs)
- Duplicate detection function (Duplicate detection)
- Error detection function (Protocol error detection)
- RLC SDU discard function (RLC SDU discard)
- RLC re-establishment function (RLC re-establishment)

In the above description, the in-sequence delivery function of an NR RLC entity refers to a function of delivering RLC SDUs, received from a lower layer, to a higher layer in sequence, and may include a function of reassembling multiple RLC SDUs if one RLC SDU has been originally segmented into the multiple RLC SDUs and received and delivering the reassembled RLC SDU. Furthermore, the NR RLC entity may include a function of reordering received RLC PDUs based on an RLC sequence number (SN) or a PDCP SN, and may include a function of recording lost RLC PDUs by reordering the sequence. Furthermore, the NR RLC entity may include a function of making a status report on lost RLC PDUs to the transmission side, and may include a function of requesting the retransmission of lost RLC PDUs. The NR RLC entity may include a function of delivering, to a higher layer, only RLC SDUs prior to a lost RLC SDU in sequence if the lost RLC SDU is present. Furthermore, the NR RLC entity may include a function of delivering, to a higher layer, all RLC SDUs received before a timer starts in sequence if the timer has expired although there is a lost RLC SDU or may include a function of delivering, to a higher layer, all RLC SDUs received so far if a given timer has expired although there is a lost RLC SDU. Furthermore, the NR RLC entity may include may include a function of processing RLC PDUs in the sequence that they are received (in order of arrival regardless of a sequence, such as a sequence number) and delivering the RLC PDUs to a PDCP entity out of sequence (i.e., out-of-sequence delivery). Furthermore, when a segment is received, the NR RLC entity may receive segments stored in a buffer or to be subsequently received, may reconfigure the segments into one complete RLC PDU, may process the RLC PDU, and may deliver the RLC PDU to a PDCP entity. The NR RLC layer may not include a concatenation function. The concatenation function may be performed in the NR MAC layer or may be substituted with the multiplexing function of the NR MAC layer.

In the above description, the out-of-sequence delivery function of the NR RLC entity may refer to a function of directly delivering, to a higher layer, RLC SDUs received from a lower layer out of sequence. Furthermore, the NR RLC entity may include a function of reassembling multiple RLC SDUs if one RLC SDU has been originally segmented into the multiple RLC SDUs and received and delivering the reassembled RLC SDU, and may include a function of storing the RLC SN or PDCP SN of received RLC PDUs, reordering their sequence, and recording lost RLC PDUs.

The NR MAC 1d-15, 1d-30 may be connected to multiple NR RLC layer devices configured in one UE. Major functions of the NR MAC may include some of the following functions.

Mapping function (Mapping between logical channels and transport channels)

Multiplexing and demultiplexing function (Multiplexing/demultiplexing of MAC SDUs)

Scheduling information report function (Scheduling information reporting)

HARQ function (Error correction through HARQ)

Priority handling function between logical channels (Priority handling between logical channels of one UE)

Priority handling function between UEs (Priority handling between UEs by means of dynamic scheduling)

MBMS service identification function (MBMS service identification)

Transport format selection function (Transport format selection)

Padding function (Padding)

An NR PHY layer 1d-20, 1d-25 may perform an operation of channel-coding and modulating higher layer data, generating the higher layer data into an OFDM symbol, and transmitting the OFDM symbol to a radio channel or demodulating an OFDM symbol received through a radio channel, channel-decoding the OFDM symbol, and transferring the OFDM symbol to a higher layer.

Figure 1E:
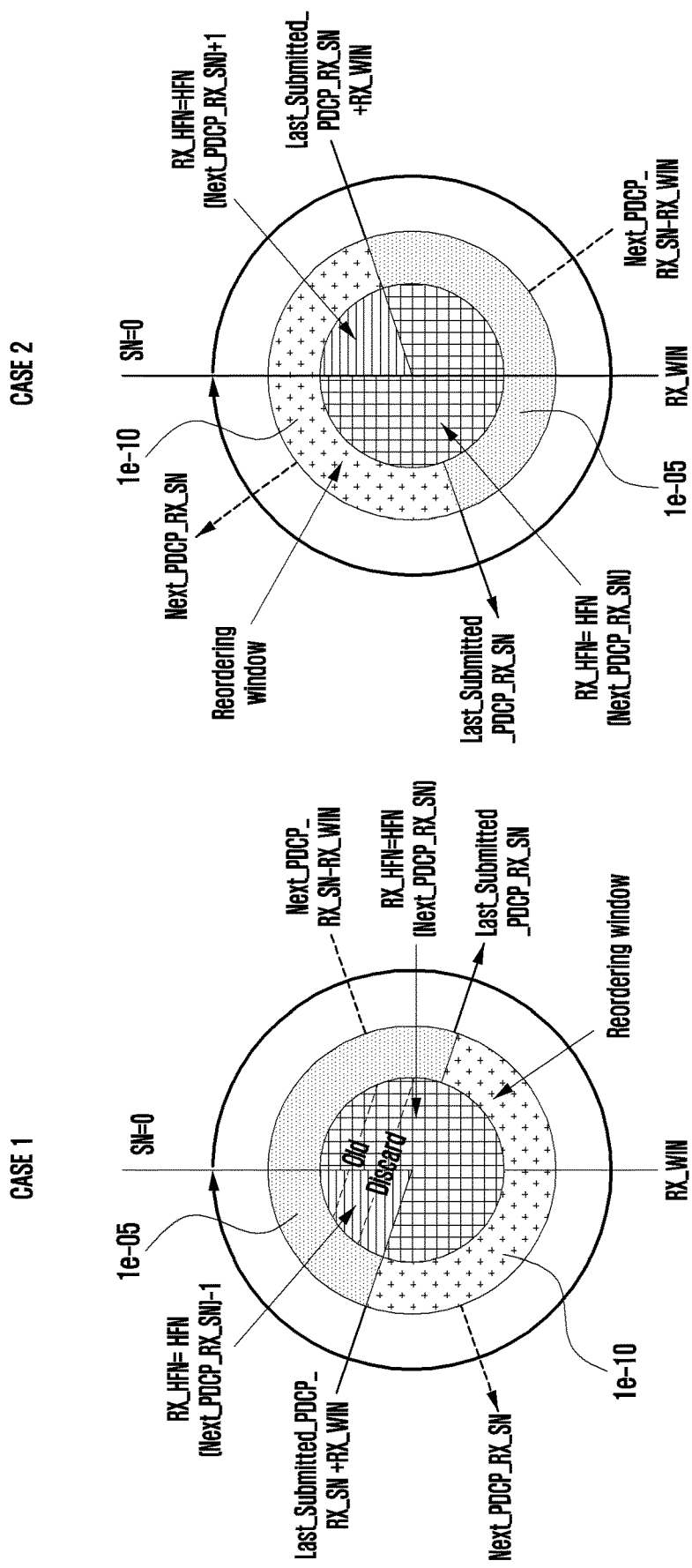
FIG. 1E is a diagram illustrating a PUSH-based window operation in a PDCP layer in an LTE system.

FIG. 1E is a diagram illustrating a PUSH-based window operation in a PDCP layer in an LTE system.

A method of performing re-ordering in an LTE system operates based on a PUSH-based window. This may have a structure in which the window is advanced based on a lower edge of the window. The lower edge of the window is defined as a PDCP sequence number and a hyper frame number (HFN) or a COUNT value delivered to a higher layer most recently. This may be defined as a variable called Last_Submitted_PDCP_RX_SN and RX_HFN. In the above description, the COUNT value is configured with 32 bits and may be configured with a combination of a PDCP sequence number and an HFN. The HFN value is increased by 1 whenever the PDCP sequence number increases up to a maximum value and is set to 0 again. As in 1e-05 of FIG. 1E, when a packet is received out of a window, it may be considered as an old packet and discarded. However, when a packet is received within a window as in 1e-10, it may be considered as a normal packet. After whether the packet has been redundantly received is checked, data processing may be performed in a PDCP layer. Furthermore, a Last_Submitted_PDCP_RX_SN variable value is updated by the PDCP sequence number (or COUNT value) of a packet delivered to a higher layer, and thus the window is advanced. In the above description, the size of the window may be set as half the space which may be assigned to the PDCP sequence number. For example, if the length of a PDCP sequence number is 12 bits, the size of a window may be set to $2^{(12-1)}$. In FIG. 1E, a circle, such as 1e-05 or 1e-10, indicates a window, and a smaller circle within the circle may be used to determine an HFN value. That is, a circle having a different color or pattern may mean that it has a different HFN.

In NR, a stable variable has been reduced compared to LTE. That is, values defined as the existing PDCP sequence number and HFN may be defined as a COUNT-based unified value. For reference, Tx/Rx PDCP state variables in LTE and NR (Tx PDCP state variables for LTE and NR, Rx PDCP state variables for LTE and NR) may be the same as those in Table 1 and Table 2.

TABLE 1

| | LTE | | NR | |
|---|---|---|---|---|
| Next_PDCP_TX_SN | Indicate the PDCP SN of a PDCP SDU to be subsequently transmitted in a PDCP entity Set to 0 upon PDCP establishment | | TX_NEXT | Indicate the COUNT of a PDCP SDU to be subsequently transmitted in a PDCP entity An initial value is set to 0 |
| TX_HFN | Indicate an HFN value generated from a COUNT value used for PDCP PDUs in a PDCP entity Set to 0 upon PDCP establishment | | | |

TABLE 2

| | LTE | | NR | |
|---|---|---|---|---|
| Next_PDCP_RX_SN | Indicate the PDCP SN of a PDCP SDU expected to be in a subsequently received PDCP entity Set to 0 upon PDCP establishment | | RX_NEXT | COUNT value of a PDCP SDU expected to be subsequently received An initial value is set to 0 |

TABLE 2-continued

| | LTE | | NR |
|---|---|---|---|
| RX_HFN | Indicate an HFN value generated from a COUNT value used for PDCP PDUs received in a PDCP entity Set to 0 upon PDCP establishment | | |
| Last_Submitted_PDCP_RX_SN | Applied only in a PDCP entity mapped to a DRB, that is, RLC AM Indicate the SN of the last PDCP SDU delivered to a higher layer Set as a maximum PDCP SN value upon PDCP establishment | RX_DELIV | Indicate the COUNT value of the last PDCP SDU delivered to a higher layer An initial value is set to $2^{32} - 1$ |

Figure 1F:
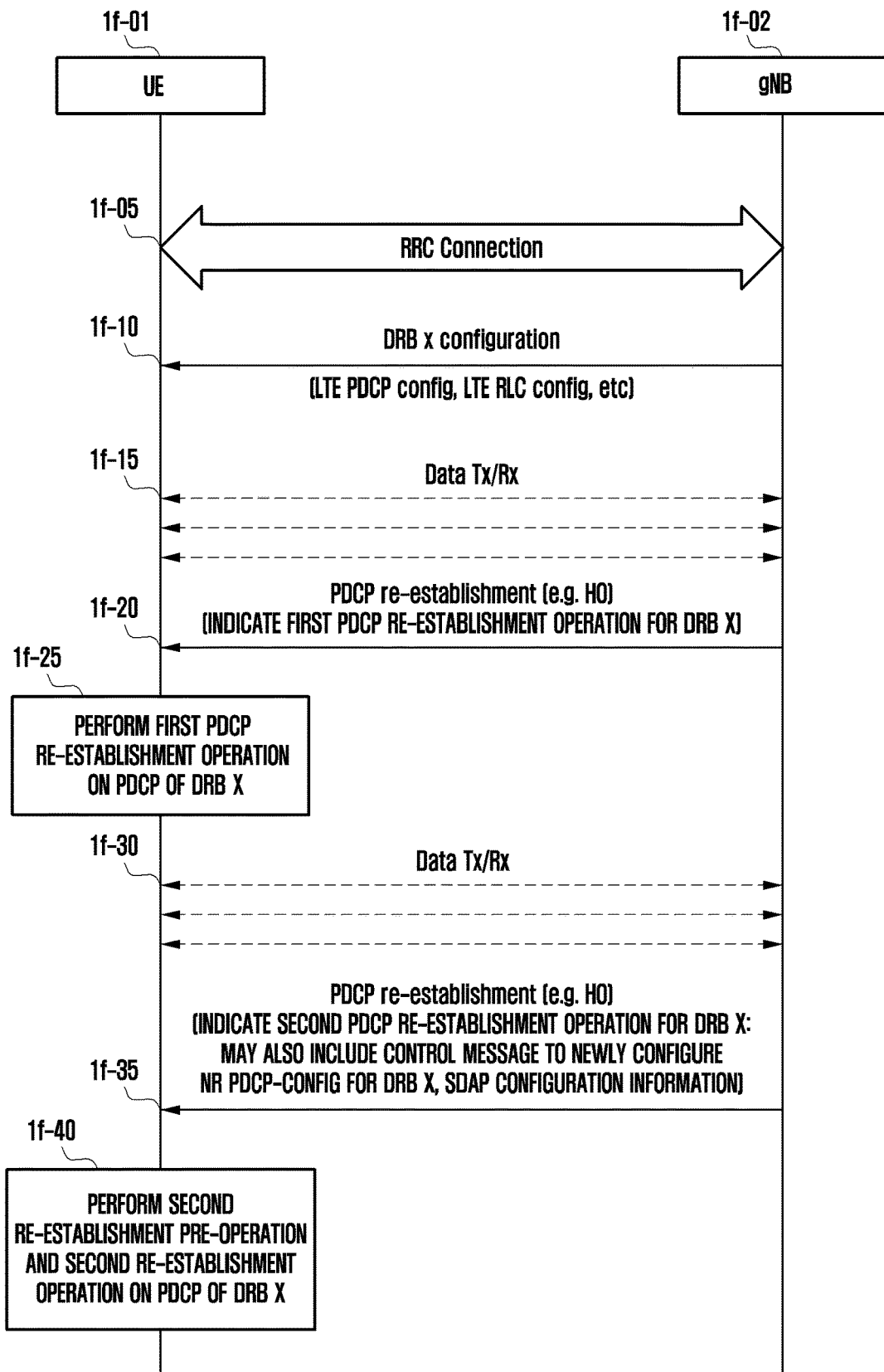
FIG. 1F is a diagram illustrating the entire PDCP re-establishment operation of indicating a change from an LTE PDCP to an NR PDCP, which is proposed in the disclosure.

FIG. 1F is a diagram illustrating the entire PDCP re-establishment operation of indicating a change from an LTE PDCP to an NR PDCP, which is proposed in the disclosure.

In the disclosure, basically, a gNB needs to both LTE and NR. In particular, it is assumed that a gNB supports LTE PDCP and NR PCDP functions. This is essential for an NR implementation of a non-standalone method based on an EN-DC mode in which LTE and NR operate as dual connectivity (DC). That is, a base station supporting EN-DC needs to be capable of two versions of PDCP configurations because it has to support both the LTE and PDCP functions. Basically, PDCP re-establishment is indicated in a change a bearer type. This may be performed according to a change procedure of handover or a sequence number (SN). In the disclosure, the entire PDCP re-establishment procedure is handled if a version is changed to an NR PDCP with respect to a DRB x operating as an LTE PDCP.

Referring back to FIG. 1F, at step 1f-10, a UE 1f-01 may receive configuration information for a given DRB x from a base station 1f-02 in an RRC connected state 1f-05. The DRB configuration includes an initial configuration for the corresponding DRB x. The corresponding DRB x may be a tunnel for transmitting and receiving data to and from an LTE UE, and may include configuration information for a PDCP, RLC and Logical channel. At step 1f-15, the DRB x may be generated and data transmission and reception may be performed between the UE 1f-01 and the base station 1f-02 depending on the configuration. At step 1f-20, when an event, such as handover (HO), occurs while the data transmission and reception are performed through step 1f-15, the UE 1f-01 may receive, from the base station 1f-02, an indication for PDCP re-establishment through an RRC reconfiguration message. The RRC reconfiguration message corresponds to a bearer change, and may indicate re-establishment for RLC or a Logical channel or MAC reset. In the disclosure, such a PDCP re-establishment operation in LTE is defined as a first PDCP re-establishment operation. At step 1f-25, the PDCP of the UE 1f-01 that has received the RRC reconfiguration message may perform a first PDCP re-establishment operation on the PDCP of a DRB x, such as that illustrated in Table 3.

TABLE 3

First PDCP re-establishment: normal procedure
(applied to a DRB mapped to RLC AM)

| Uplink (Transmitting entity) | Downlink (Receiving entity) |
|---|---|
| Reset header compression Apply a received cipher algorithm and key Start the retransmission of PDCP SDUs (from the first PDCP SDU for which the successful delivery of a corresponding PDCP PDU has not been confirmed by lower layers); Generate a status report (Use First Missing Sequence number) | Process PDCP PDUs received from a lower layer Reset header compression Stop and reset t-reordering Apply the cipher algorithm and key |

Furthermore, at step 1f-30, the UE 1f-01 may transmit and receive data to and from the base station 1f-02 through the PDCP configuration applied through the first PDCP re-establishment procedure. At step 1f-35, the UE 1f-01 operating as LTE may receive, from the base station 1f-02 supporting NR, an indication for data transmission related to NR through handover. That is, transmission through an NR DRB needs to be performed. In such a case, the UE may receive, from the base station, a second PDCP re-establishment indication including an NR PDCP setting value through an RRC reconfiguration message. For example, the PDCP re-establishment configuration may be a control message to newly configure an NR PDCP-config with respect to the DRB x. In this case, the PDCP re-establishment configuration may also include configuration information (SDAP mode information, QoS flow ID configuration information, reflective indication configuration information) for an SDAP layer. That is, in LTE, when a PDCH change from LTE to NR is indicated, a configuration for a new SDAP is necessary because an SDAP layer is not present. When the UE 1f-01 receives an RRC message including the second PDCP re-establishment indication, at step 1f-40, it may perform a second PDCP re-establishment pre-operation and a second PDCP re-establishment operation on the DRB x.

The second PDCP re-establishment pre-operation means an operation of processing all of the 2nd set of PDCP PDUs as PDCP SDUs in the receiving entity of an LTE PDCP. In this case, the 2nd set of PDCP PDUs means a PDCP PDU received due to the re-establishment operation of a lower layer. That is, the second PDCP re-establishment pre-operation is the step of processing LTE PDCP PDUs received prior to a PDCP operation based on a version change of a PDCP from LTE to NR. The 2nd set of PDCP PDUs is configured with an LTE PDCP format. Accordingly, the above operation is performed in the LTE PDCP in order to correctly interpret information of an LTE PDCP header. The second PDCP re-establishment pre-operation will be described using an example in FIG. 1G.

The second PDCP re-establishment operation means an operation performed in the PDCP of the UE 1f-01 after an indication for a change from an LTE PDCP to an NR PDCP is received. For example, operations listed in Table 4 may be performed.

PDCP data and receives an indication for a version change in an NR PDCP through a bearer reconfiguration, for a given cause, for example, through handover, a pre-operation is necessary so that an SDAP does not need to distinguish between a packet to which an SDAP header has been attached (one newly received in the NR PDCP) and a packet to which an SDAP header has not been attached (one that had been received in the LTE PDCP). This is described based on the example illustrated in the figure. A case where the base station has transmitted PDCP PDUs whose PDCP SNs are 0, 1, 2, 3, 4, 5, 6, and 7 to the UE and the UE has not received acknowledgement for PDCP PDUs whose PDCP SNs are 4 and 5 from a lower layer.

1. A non transparent SDAP configuration (i.e., if SDAP header contents are present)

An out-of-sequence PDCP SDUs (corresponding to PDCP PDUs whose PDCP SNs are 6 and 7) are

TABLE 4

| Second PDCP re-establishment: new procedure (applied to a DRB mapped to RLC AM) | |
| --- | --- |
| Uplink (Transmitting entity) | Downlink (Receiving entity) |
| Reset header compression<br>Apply a received ciphering algorithm and key<br>Adjust an LTE TX state variable to an NR TX state variable (set TX_NEXT using NEXT_PDCP_TX_SN and TX_HFN, that is, configure TX_NEXT by concatenating TX_HFN and NEXT_PDCP_TX_SN)<br>Start a PDCP SDU retransmission procedure<br>If an SDAP entity is configured and a transmission mode is not set (or in the same meaning if an SDAP header including given information is inserted)<br>A PDCP delivers a 1$^{st}$ set of PDCP SDUs to an SDAP layer in ascending power of a corresponding COUTN value (in this case, the 1$^{st}$ set of PDCP SDUs means PDCP SDUs for which the successful delivery of a PDCP PDU has not been confirmed by a lower layer)<br>The SDAP attaches an SDAP header to the 1$^{st}$ set of PDCP SDUs delivered by the PDCP and then delivers them to the PDCP again in order of the PDCP SDUs received. After processing all the 1$^{st}$ set of PDCP SDUs, the SDAP attaches an SDAP header to IP packets downloaded from a higher layer and delivers them to a lower layer.<br>Process the PDCP SDUs received from the SDAP<br>Start retransmission<br>Generate a status report (using First Missing Sequence Number) | Adjust an LTE RX state variable to an NR RX state variable (RX_DELIV and RX_NEXT of the following NR RX variables are configured by the concatenation of values corresponding to an HFN and an SN in LTE)<br>Set RX_DELIV using Last_Submited_PDCP_RX_SN and RX_HFN<br>Set an HFN(RX_DELIV) using RX_HFN<br>Set RX_NEXT using NEXT_PDCP_RX_SN and RX_HFN<br>Reset header compression<br>Stop and reset t-reordering<br>Apply a received ciphering algorithm and key<br>Initiate t-reordering if a stored PDCP SDU is present. |

FIG. 1G is a diagram illustrating an example of a second PDCP re-establishment pre-operation, which is considered in the disclosure.

As the second PDCP re-establishment pre-operation has been described in FIG. 1F, the second PDCP re-establishment pre-operation means an operation of processing all of a 2nd set of PDCP PDUs into PDCP SDUs in the receiving entity of an LTE PDCP. In this case, the 2nd set of PDCP PDUs means PDCP PDUs received due to the re-establishment operation of a lower layer. That is, the second PDCP re-establishment pre-operation is the step of processing LTE PDCP PDUs received prior to a PDCP operation based on a version change of a PDCP from LTE to NR. In order to correctly interpret information of an LTE PDCP header, the above operation is performed in an LTE PDCP because the 2nd set of PDCP PDUs is configured with an LTE PDCP format.

In FIG. 1G, if a UE 1g-25~1g-40 receives a PDCP packet from a base station 1g-05~1g-20 that transmits LTE immediately delivered to an upper layer so that they do not experience an SDAP. This means that PDCP SNs whose reception has not been completed do not process PDCP SDUs 4 and 5. That is, the lossless of a PDCP packet is not applied.

2. A transparent SDAP configuration (or if an SDAP header has not been configured)

A UE stores out-of-sequence PDCP SDUs (corresponding to PDCP PDUs whose PDCP SNs are 6 and 7) in a buffer. Thereafter, if PDCP PDUs whose PDCP SNs are 4 and 5 are received from a changed NR PDCP, the UE delivers the PDCP PDUs to an upper layer in sequence.

As described above, the second PDCP re-establishment pre-operation is an operation of enabling an SDAP to not need to distinguish between a packet to which an SDAP header has been attached (one newly received in the NR PDCP) and a packet to which an SDAP header has not been attached (one that had been received in the LTE PDCP) in a DRB received from the base station after the second PDCP re-establishment operation is received.

Figure 1H:
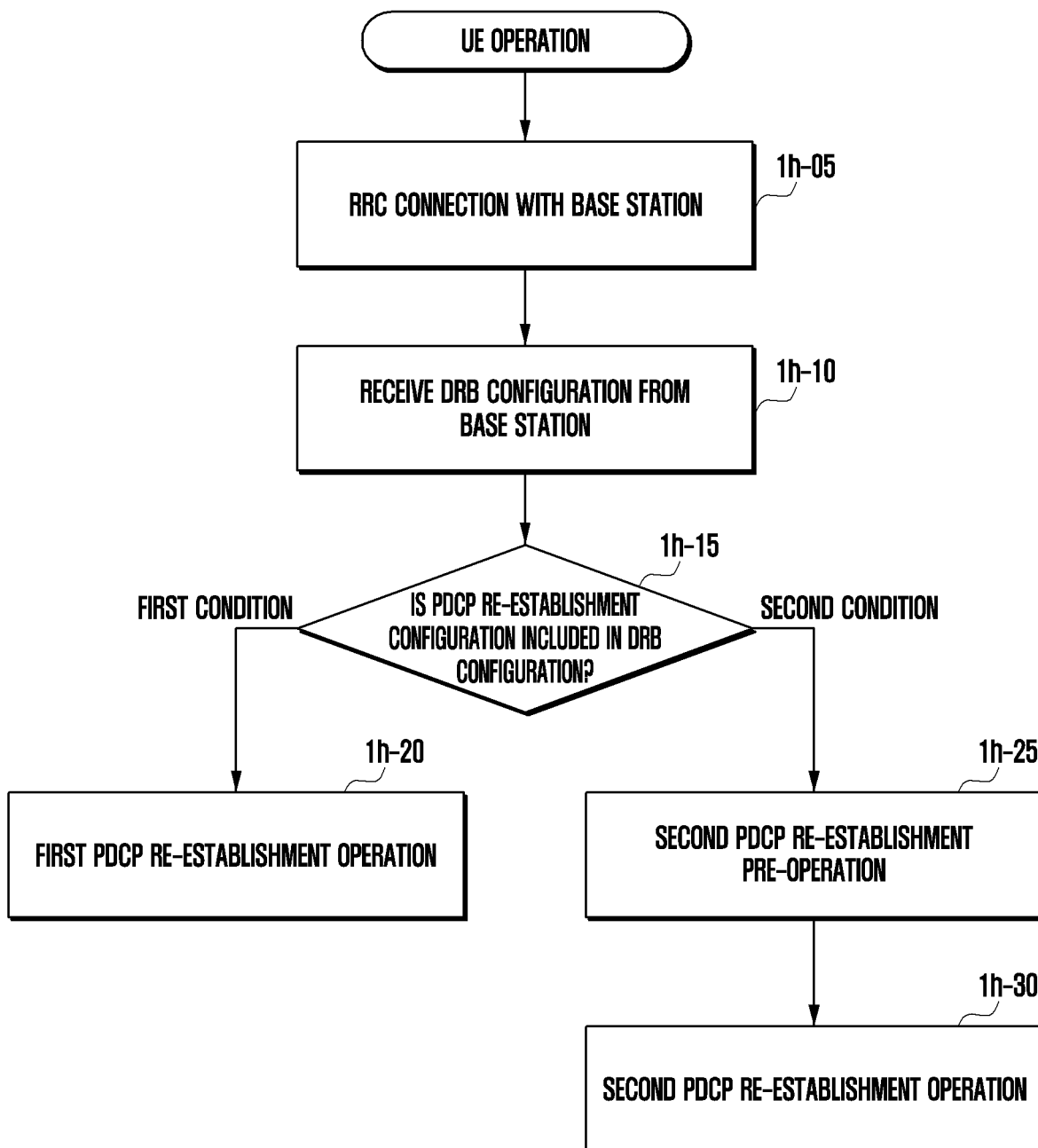
FIG. 1H is a diagram illustrating a UE operation performing a PDCP re-establishment operation to which the disclosure is applied.

FIG. 1H is a diagram illustrating a UE operation performing a PDCP re-establishment operation to which the disclosure is applied.

A UE whose RRC connection with a base station has been configured at step 1h-05 may identify the DRB configuration of an RRC reconfiguration message received from the base station when an event in which handover or an SN change procedure is triggered occurs at step 1h-10. At step 1h-15, the UE may identify whether a PDCP re-establishment configuration is included in the corresponding DRB configuration. Furthermore, if a first condition is satisfied, at step 1h-20, the UE performs a first PDCP re-establishment operation. In the above description, the first condition corresponds to a case where the UE has received an LTE PDCP configuration from the base station, and a detailed operation thereof will be described in FIG. 1F. In contrast, if a PDCP re-establishment configuration is included in the corresponding DRB configuration and a second condition is satisfied, at step 1h-25, the UE performs a second PDCP re-establishment pre-operation. Thereafter, at step 1h-30, the UE performs a second PDCP re-establishment operation. In the above description, the second condition corresponds to a case where the UE operates based on an LTE PDCP configuration and receives an indication for an NR PDCP configuration from the base station, and a detailed operation thereof will be described in FIGS. 1F and 1G.

Figure 1I:
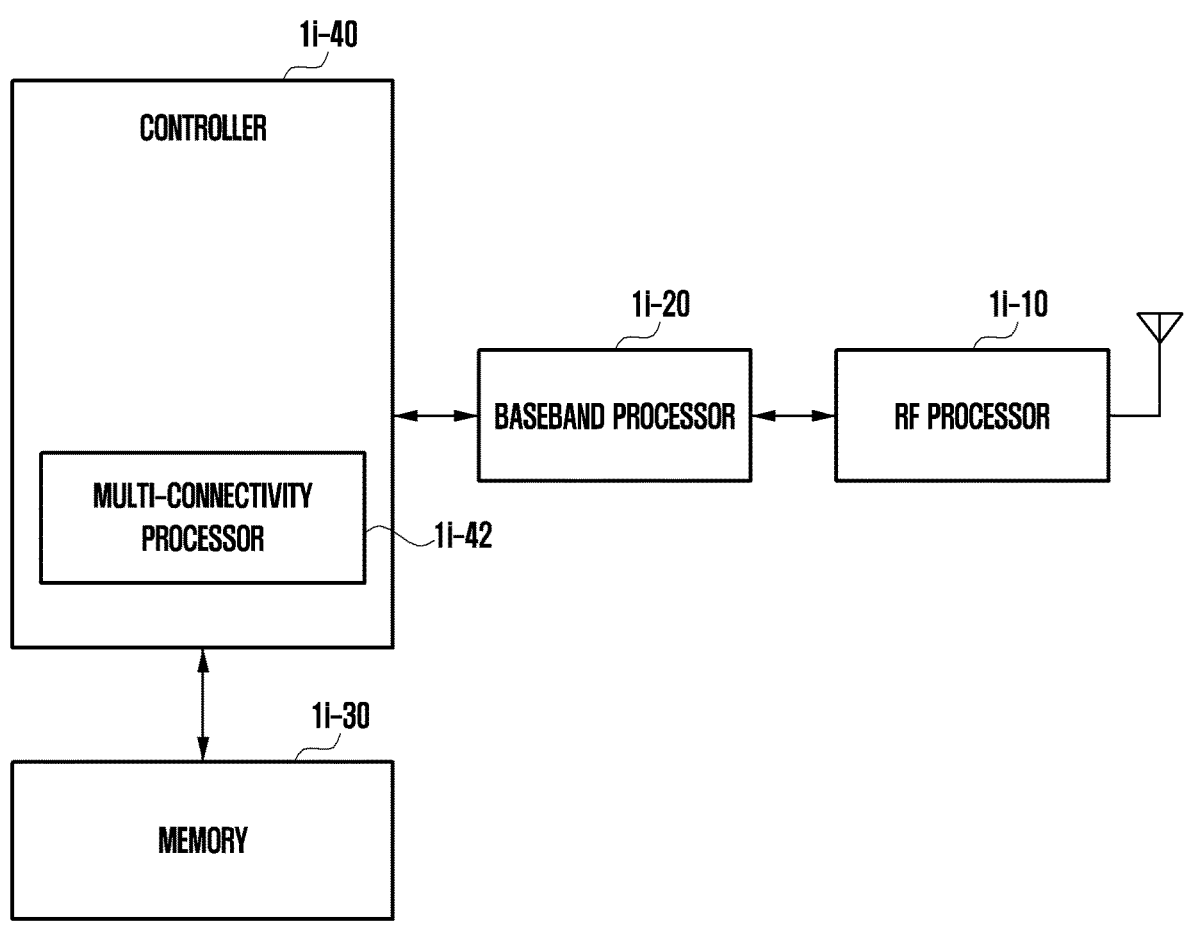
FIG. 1I is a block diagram illustrating an internal structure of a UE to which the disclosure has been applied.

FIG. 1I is a block diagram illustrating an internal structure of a UE to which the disclosure has been applied.

Referring to the figure, the UE includes a radio frequency (RF) processor 1i-10, a baseband processor 1i-20, a memory 1i-30, and a controller 1i-40.

The RF processor 1i-10 performs a function for transmitting and receiving signals through a radio channel, such as the band conversion, amplification, etc. of a signal. That is, the RF processor 1i-10 up-converts a baseband signal received from the baseband processor 1i-20 into an RF band signal, transmits the RF band signal through an antenna, and down-converts an RF band signal received through the antenna into a baseband signal. For example, the RF processor 1i-10 may include a transmission filter, a reception filter, an amplifier, a mixer, an oscillator, a digital to analog convertor (DAC), and an analog to digital convertor (ADC). In FIG. 1I, only one antenna has been illustrated, but the UE may include multiple antennas. Furthermore, the RF processor 1i-10 may include multiple RF chains. Furthermore, the RF processor 1i-10 may perform beamforming. For the beamforming, the RF processor 1i-10 may adjust the phase and size of each of signals transmitted/received through multiple antennas or antenna elements. Furthermore, the RF processor may perform MIMO. When the RF processor performs the MIMO operation, it may receive multiple layers.

The baseband processor 1i-20 performs a baseband signal and inter-bit stream conversion function based on the physical layer standard of a system. For example, when data is transmitted, the baseband processor 1i-20 generates complex symbols by coding and modulating a transmission bit stream. Furthermore, when data is received, the baseband processor 1i-20 reconstructs a reception bit stream from a baseband signal received from the RF processor 1i-10 through demodulation and decoding. For example, if an orthogonal frequency division multiplexing (OFDM) scheme is applied, when data is transmitted, the baseband processor 1i-20 generates complex symbols by coding and modulating a transmission bit stream, maps the complex symbols to subcarriers, and then configures OFDM symbols through an inverse fast Fourier transform (IFFT) operation and cyclic prefix (CP) insertion. Furthermore, when data is received, the baseband processor 1i-20 segments a baseband signal received from the RF processor 1i-10 in an OFDM symbol unit, reconstructs signals mapped to subcarriers through a fast Fourier transform (FFT) operation, and reconstructs a reception bit stream through demodulation and decoding.

The baseband processor 1i-20 and the RF processor 1i-10 transmit and receive signals as described above. Accordingly, the baseband processor 1i-20 and the RF processor 1i-10 may be called a transmitter, a receiver, a transceiver or a communication unit. Furthermore, at least one of the baseband processor 1i-20 and the RF processor 1i-10 may include multiple communication modules in order to support different multiple radio access technologies. Furthermore, at least one of the baseband processor 1i-20 and the RF processor 1i-10 may include different communication modules in order to process signals of different frequency bands. For example, the different radio access technologies may include a wireless LAN (e.g., IEEE 802.11), a cellular network (e.g., LTE), etc. Furthermore, the different frequency bands may include a super high frequency (SHF) (e.g., 2 NRHz, NRhz) band and a millimeter wave (e.g., 60 GHz) band.

The memory 1i-30 stores data, such as a basic program, an application program, and configuration information for the operation of the UE. In particular, the memory 1i-30 may store information related to a second access node that performs wireless communication using a second radio access technology. The memory 1i-30 provides stored data in response to a request from the controller 1i-40.

The controller 1i-40 controls an overall operation of the UE. For example, the controller 1i-40 transmits/receives a signal through the baseband processor 1i-20 and the RF processor 1i-10. Furthermore, the controller 1i-40 writes data in the memory 1i-40 and reads data from the memory 1i-40. To this end, the controller 1i-40 may include at least one processor. For example, the controller 1i-40 may include a communication processor (CP) performing control for communication and an application processor (AP) controlling a higher layer, such as an application program.

Figure 1J:
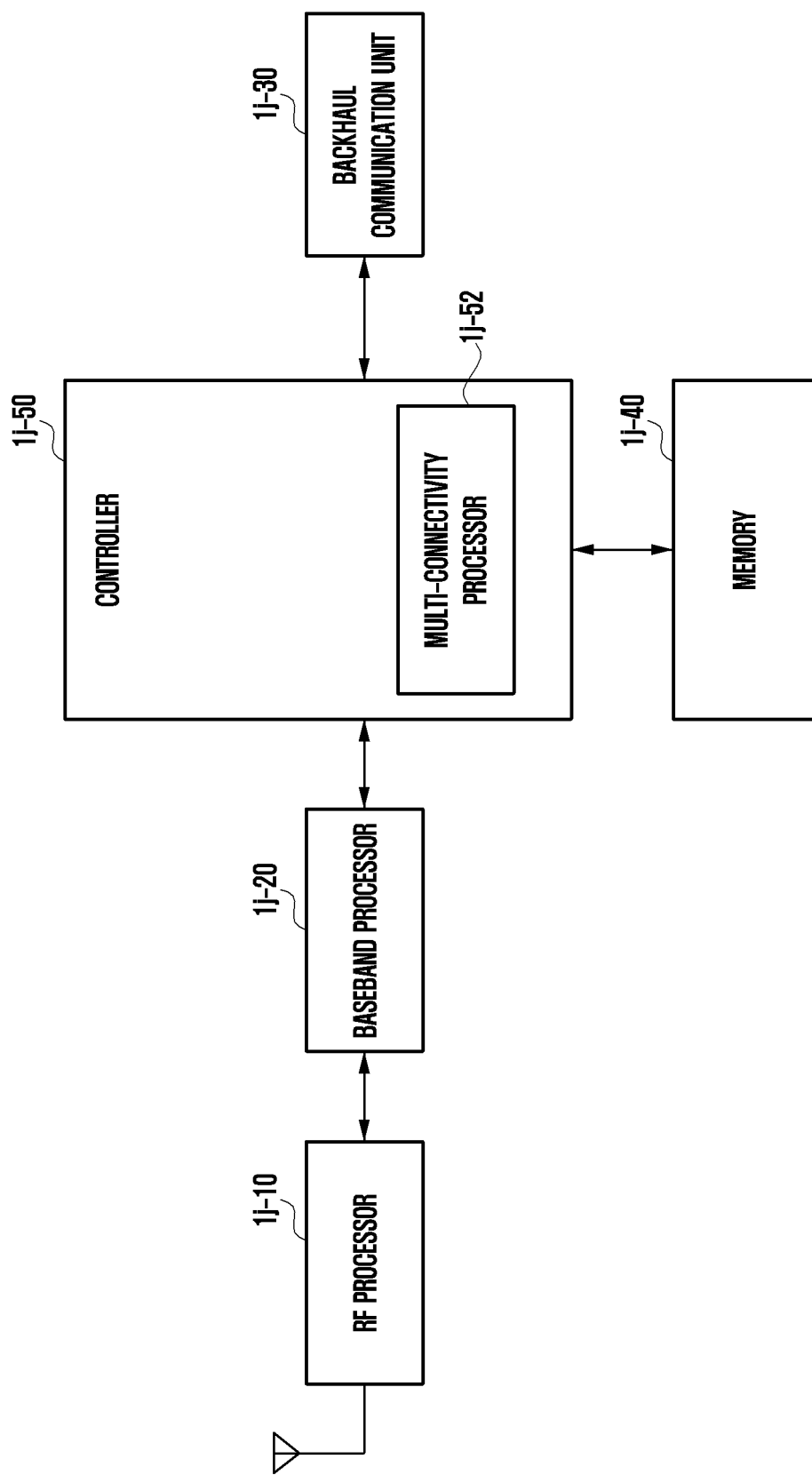
FIG. 1J is a block diagram illustrating the configuration of a base station according to the disclosure.

FIG. 1J is a block diagram illustrating the configuration of a base station according to the disclosure.

As illustrated in the figure, the base station is configured to include an RF processor 1j-10, a baseband processor 1j-20, a backhaul communication unit 1j-30, a memory 1j-40 and a controller 1j-50.

The RF processor 1j-10 performs a function for transmitting and receiving signals through a radio channel, such as the band conversion and amplification of a signal. That is, the RF processor 1j-10 up-converts a baseband signal received from the baseband processor 1j-20 into an RF band signal, transmits the RF band signal through an antenna, and down-converts an RF band signal received through the antenna into a baseband signal. For example, the RF processor 1j-10 may include a transmission filter, a reception filter, an amplifier, a mixer, an oscillator, a DAC, and an ADC. In FIG. 1K, only one antenna has been illustrated, but the first access node may include multiple antennas. Furthermore, the RF processor 1j-10 may include multiple RF chains. Furthermore, the RF processor 1j-10 may perform beamforming. For the beamforming, the RF processor 1j-10 may adjust the phase and size of each of signals transmitted/received multiple antennas or antenna elements. The RF processor may perform a downlink MIMO operation by transmitting one or more layers.

The baseband processor 1j-20 performs a baseband signal and inter-bit stream conversion function based on the physical layer standard of a first radio access technology. For example, when data is transmitted, the baseband processor 1j-20 generates complex symbols by coding and modulating a transmission bit stream. Furthermore, when data is received, the baseband processor 1j-20 reconstructs a reception bit stream from a baseband signal received from the RF processor 1j-10 through demodulation and decoding. For example, if the OFDM scheme is applied, when data is transmitted, the baseband processor 1j-20 generates complex symbols by coding and modulating a transmission bit stream, maps the complex symbols to subcarriers, and configures OFDM symbols through IFFT operation and CP insertion. Furthermore, when data is received, the baseband processor 1j-20 segments a baseband signal received from the RF processor 1j-10 in an OFDM symbol unit, reconstructs signals mapped to subcarriers through FFT operation, and then reconstructs a reception bit stream through demodulation and decoding. The baseband processor 1j-20 and the RF processor 1j-10 transmit and receive signals as described above. Accordingly, the baseband processor 1j-20 and the RF processor 1j-10 may be called a transmitter, a receiver, a transceiver, a communication unit or a wireless communication unit.

The backhaul communication unit 1j-30 provides an interface for performing communication with other nodes within a network. That is, the backhaul communication unit 1j-30 physically converts a bit stream, transmitted from a primary base station to another node, for example, a secondary base station, a core network, etc., into a physical signal, and converts a physical signal, received from another node, into a bit stream.

The memory 1j-40 stores data, such as a basic program, an application program, and configuration information for the operation of the base station. Specifically, the memory 1j-40 may store information on a bearer allocated to an accessed UE and measurement results reported by an accessed UE. Furthermore, the memory 1j-40 may store information, that is, a criterion by which whether to provide a UE with multiple connections is determined. Furthermore, the memory 1j-40 provides stored data in response to a request from the controller 1j-50.

The controller 1j-50 controls an overall operation of the primary base station. For example, the controller 1j-50 transmits/receives a signal through the baseband processor 1j-20 and the RF processor 1j-10 or through the backhaul communication unit 1j-30. Furthermore, the controller 1j-50 writes data in the memory 1j-40 and reads data from the memory 1j-40. To this end, the controller 1j-50 may include at least one processor.

The following is the summarized contents of contents described in the disclosure.

The disclosure is for defining a PDCP re-establishment operation from an LTE PDCP to an NR PDCP.

Furthermore, the entire operation according to an embodiment of the disclosure may be as follows.

1. A UE establishes an RRC connection in LTE
2. Receives a control message indicating a DRB x configuration: LTE PDCP-config, LTE RLC-config, etc.
3. Data transmission and reception in the DRB x
4. Receive a control message indicative of first re-establishment execution for the PDCP of the DRB x (e.g., a control message indicating handover)
5. First re-establishment execution for the PDCP of the DRB x

| DRB mapped on RLC AM (First PDCP re-establishment; normal procedure) | |
| --- | --- |
| Uplink (Transmitting entity) | Downlink (Receiving entity) |
| Reset header compression; Apply the cipher algorithm and key; Start retransmission of PDCP SDUs (from the first PDCP SDU for which the successful delivery of the corresponding PDCP PDU has not been confirmed by lower layers); Compile a status report; Use First Missing Sequence number | Process the PDCP PDUs received from lower layer Reset header compression Stop and reset t-reordering Apply the cipher algorithm and key |

6. Data transmission and reception in the DRB x

7. Receive a control message indicating second re-establishment execution for the PDCP of the DRB x (e.g., a control message to newly configure NR PDCP-config for the DRB x). The message may also include SDAP configuration information.

8. Second re-establishment pre-operation and second reestablishment operation execution for the DRB x Pre-Operation (Execution Only in the Receiving Entity)

An LTE PDCP receiving entity may process all of a 2nd set of PDCP PDUs into PDCP SDUs (the 2nd set of PDCP PDUs may mean PDCP PDUs received due to the re-establishment operation of a lower layer). ->the above operation is performed in an LTE PDCP in order to correctly interpret information of an LTE PDCP header.

Out-of-sequence PDCP SDUs are immediately delivered to an upper layer without passing through an SDAP if a non transparent SDAP is to be configured (lossless is not applied). Furthermore, if a transparent SDAP is to be applied, out-of-sequence PDCP SDUs are stored in a buffer. ->this is for enabling an SDAP to need not to distinguish a packet to which an SDAP header has been attached (one newly received in the NR PDCP) and a packet to which an SDAP header has not been attached (one that had been received in the LTE PDCP).

Second Re-Establishment Operation

| DRB mapped on RLC AM (Second PDCP re-establishment, new procedure) | |
|---|---|
| Uplink (Transmitting entity) | Downlink (Receiving entity) |
| Reset header compression<br>Apply the ciphering algorithm and key<br>Set TX_NEXT using NEXT_PDCP_TX_SN and TX_HFN (adjust an LTE TX state variable to an NR TX state variable)<br>Start the retransmission of PDCP SDUs<br>If an SDAP entity is configured and it is not a transmission mode<br>PDCP forwards a 1$^{st}$ set of PDCP SDUs to the SDAP in the ascending order of the associated COUTN (the 1$^{st}$ set of PDCP SDUs are PDCP SDUs for which the successful delivery of a PDCP PDU has not been confirmed by a lower layer)<br>The SDAP attaches an SDAP header to the 1$^{st}$ set of PDCP SDUs delivered by the PDCP and then delivers them to the PDCP again in order of the PDCP SDUs received. After processing all the 1$^{st}$ set of PDCP SDUs, the SDAP attaches an SDAP header to IP packets downloaded from a higher layer and delivers them to a lower layer.<br>Process the PDCP SDUs received from the SDAP<br>Start retransmission<br>Compile a status report using First Missing Count | Set RX_DELIV using Last_Submited_PDCP_RX_SN and RX_HFN<br>Set HFN(RX_DELIV) using RX_HFN<br>Set RX_NEXT using NEXT_PDCP_RX_SN and RX_HFN<br>Reset header compression<br>Stop and reset t-reordering<br>Initiate t-reordering if a stored PDCP SDU is present<br>Apply the ciphering algorithm and key |

9. Data transmission and reception in the DRB x

Embodiment 2

Figure 2A:
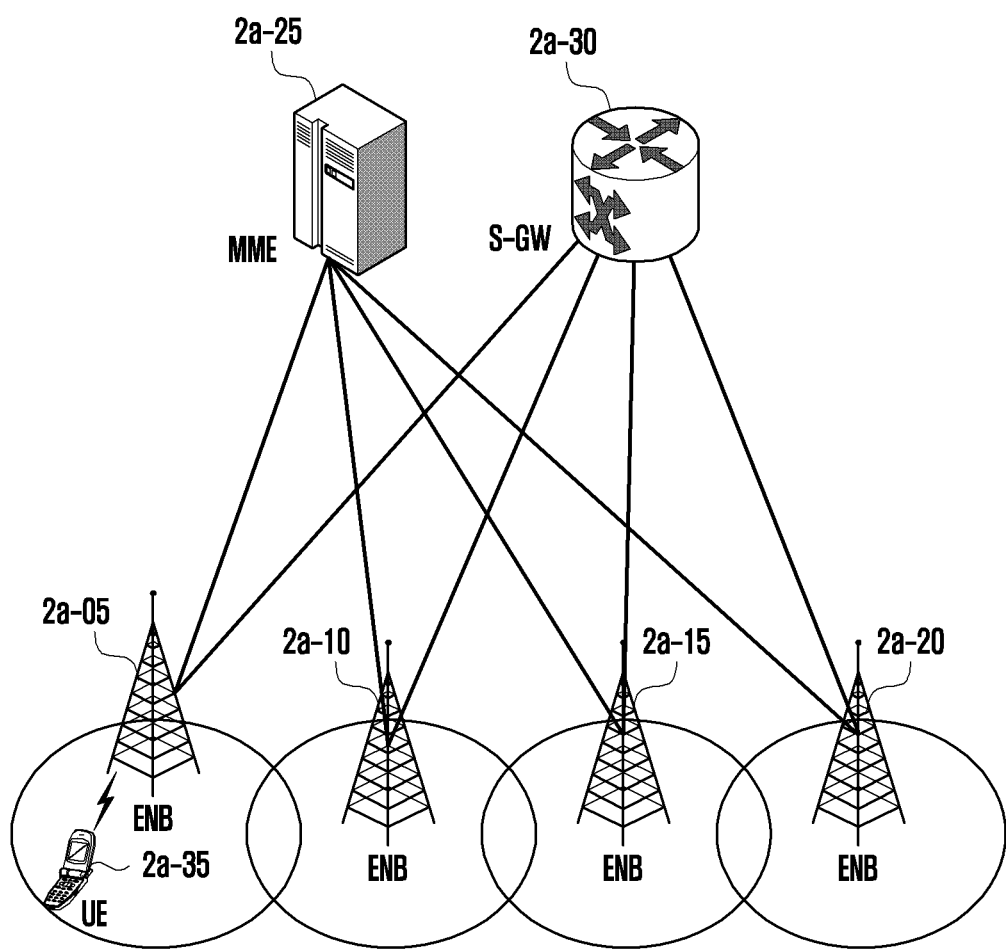
FIG. 2A is a diagram illustrating the architecture of an LTE system to which reference is made for the description of the disclosure.

FIG. 2A is a diagram illustrating the architecture of an LTE system to which reference is made for the description of the disclosure.

Referring to FIG. 2A, as illustrated, the radio access network of the LTE system includes next-generation evolved Node Bs (hereinafter referred to as "eNBs", "Node Bs" or "base stations") 2a-05, 2a-10, 2a-15, and 2a-20, a mobility management entity (MME) 2a-25, and a serving-gateway (S-GW) 2a-30. A user equipment (hereinafter referred to as a "UE" or "terminal") 2a-35 accesses an external network through the eNBs 2a-05~2a-20 and the S-GW 2a-30.

In FIG. 2A, the eNBs 2a-05~2a-20 correspond to the Node Bs of the existing UMTS system. The eNB is connected to the UE 2a-35 through a radio channel and performs a more complex function than the existing Node B. In the LTE system, all of types of user traffic including a real-time service, such as voice over IP (VoIP), through the Internet protocol, are served through a shared channel. Accordingly, a device that performs schedules by collecting state information, such as the buffer state, available transmission power state, and channel state of UEs, is necessary. The eNBs 2a-05~2a-20 are in charge of such a device. In general, one eNB controls multiple cells. For example, in order to implement the transfer rate of 100 Mbps, the LTE system uses orthogonal frequency division multiplexing (hereinafter referred to as "OFDM") as a radio access technology in the 20 MHz bandwidth, for example. Furthermore, the LTE system adopts an adaptive modulation & coding (hereinafter referred to as "AMC") scheme for determining a modulation scheme and a channel coding rate based on the channel state of a UE. The S-GW 2a-30 provides a data bearer and generates or removes a data bearer under the control of the MME 2a-25. The MME is in charge of various control functions in addition to a mobility management function for a UE, and is connected to multiple base stations.

Figure 2B:
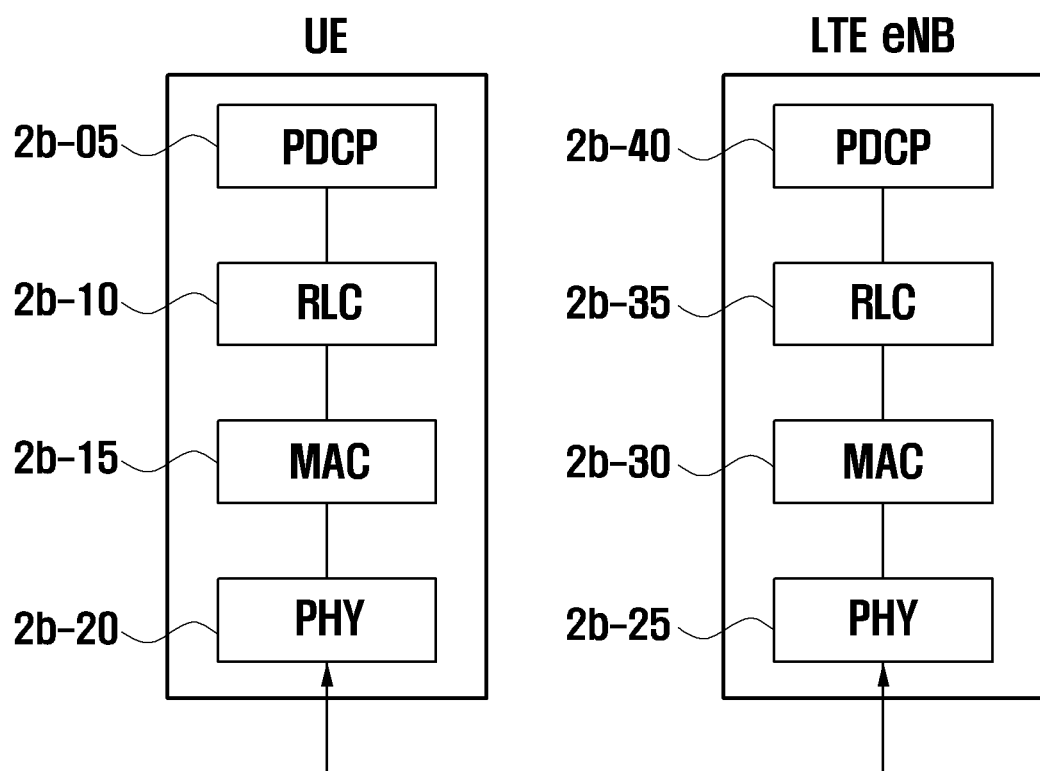
FIG. 2B is a diagram illustrating a radio protocol structure in an LTE system to which reference is made for the description of the disclosure.

FIG. 2B is a diagram illustrating a radio protocol structure in an LTE system to which reference is made for the description of the disclosure.

Referring to FIG. 2B, the radio protocol of the LTE system includes packet data convergence protocols (PDCPs) 2b-05 and 2b-40, radio link control (RLC) 2b-10 and 2b-35, and medium access control (MAC) 2b-15 and 2b-30 in a UE and an eNB, respectively. The PDCPs 2b-05 and 2b-40 are in charge of an operation, such as IP header compression/restoration. Major functions of the PDCP 2b-05, 2b-40 are summarized as follows.

Header compression and decompression function (Header compression and decompression: ROHC only)
    User data transfer function (Transfer of user data)
    In-sequence delivery function (In-sequence delivery of upper layer PDUs at PDCP re-establishment procedure for RLC AM)
    Sequence reordering function (For split bearers in DC (only support for RLC AM): PDCP PDU routing for transmission and PDCP PDU reordering for reception)
    Duplicate detection function (Duplicate detection of lower layer SDUs at PDCP re-establishment procedure for RLC AM)
    Retransmission function (Retransmission of PDCP SDUs at handover and, for split bearers in DC, of PDCP PDUs at PDCP data-recovery procedure, for RLC AM)
    Ciphering and deciphering function (Ciphering and deciphering)
    Timer-based SDU deletion function (Timer-based SDU discard in uplink.)

The RLC 2b-10, 2b-35 reconfigures a PDCP packet data unit (PDU) in a proper size and performs an ARQ operation. Major functions of the RLC are summarized as follows.

Data transfer function (Transfer of upper layer PDUs)
    ARQ function (Error Correction through ARQ (only for AM data transfer))

Concatenation, segmentation and reassembly function (Concatenation, segmentation and reassembly of RLC SDUs (only for UM and AM data transfer))

Re-segmentation function (Re-segmentation of RLC data PDUs (only for AM data transfer))

Sequence reordering function (Reordering of RLC data PDUs (only for UM and AM data transfer)

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

The MAC 2b-15, 2b-30 is connected to multiple RLC layer devices configured in one UE, and performs an operation of multiplexing RLC PDUs with a MAC PDU and demultiplexing RLC PDUs from a MAC PDU. Major functions of the MAC are summarized as follows.

Mapping function (Mapping between logical channels and transport channels)

Multiplexing and demultiplexing function (Multiplexing/demultiplexing of MAC SDUs belonging to one or different logical channels into/from transport blocks (TB) delivered to/from the physical layer on transport channels)

Scheduling information report function (Scheduling information reporting)

HARQ function (Error correction through HARQ)

Priority handling function between logical channels (Priority handling between logical channels of one UE)

Priority handling function between UEs (Priority handling between UEs by means of dynamic scheduling)

MBMS service identification function (MBMS service identification)

Transport format selection function (Transport format selection)

Padding function (Padding)

A physical layer (PHY) 2b-20, 2b-25 performs an operation of channel-coding and modulating higher layer data, generating the higher layer data into an OFDM symbol, and transmitting the OFDM symbol through a radio channel or demodulating an OFDM symbol received through a radio channel, channel-decoding the OFDM symbol, and transmitting the OPDM symbol to a higher layer.

Figure 2C:
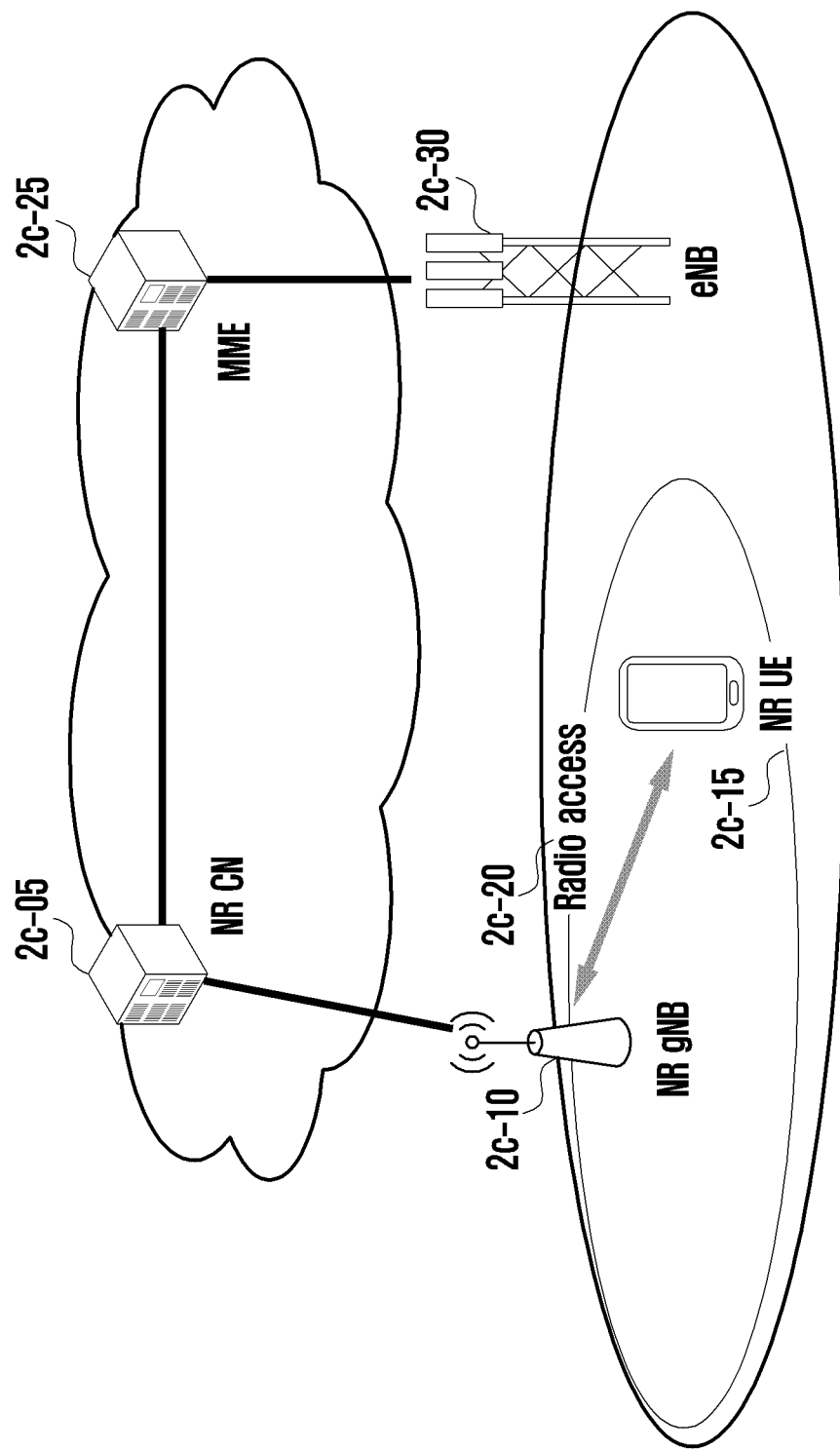
FIG. 2C is a diagram illustrating the architecture of a next-generation mobile communication system to which the disclosure is applied.

FIG. 2C is a diagram illustrating the architecture of a next-generation mobile communication system to which the disclosure is applied.

Referring to FIG. 2C, the radio access network of a next-generation mobile communication system is configured with a new radio Node B (hereinafter referred to as an "NR NB" or "NR gNB") 2c-10 and a new radio core network (NR CN) 2c-05. A new radio user equipment (hereinafter referred to as an "NR UE" or a "terminal") 2c-15 accesses an external network through the NR gNB 2c-10 and the NR CN 2c-05.

In FIG. 2C, the NR gNB 2c-10 corresponds to an evolved Node B (eNB) in the existing LTE system. The NR gNB is connected to the NR UE 2c-15 through a radio channel, and may provide an excellent service compared to the existing Node B. A next-generation mobile communication system requires a device for performing scheduling by collecting state information, such as the buffer state, available transmission power state, and channel state of UEs, because all of types of user traffic are served through a shared channel. The NR gNB 2c-10 is in charge of the device. In general, one NR gNB controls multiple cells. In order to implement ultra-high speed data transfer compared to the existing LTE, the next-generation mobile communication system may have the existing maximum bandwidth or more, and the beamforming technology may be additionally grafted using orthogonal frequency division multiplexing (hereinafter referred to as "OFDM") as a radio access technology. Furthermore, the next-generation mobile communication system adopts an adaptive modulation & coding (hereinafter referred to as "AMC") scheme of determining a modulation scheme and channel coding rate based on the channel state of a UE. The NR CN 2c-05 performs functions, such as mobility support, a bearer setup, and a QoS configuration. The NR CN 2c-05 is in charge of various control functions in addition to a mobility management function for a UE, and is connected to multiple base stations. Furthermore, the next-generation mobile communication system may also operate in conjunction with the existing LTE system. The NR CN is connected to an MME 2c-25 through a network interface. The MME is connected to an eNB 2c-30, that is, the existing base station.

Figure 2D:
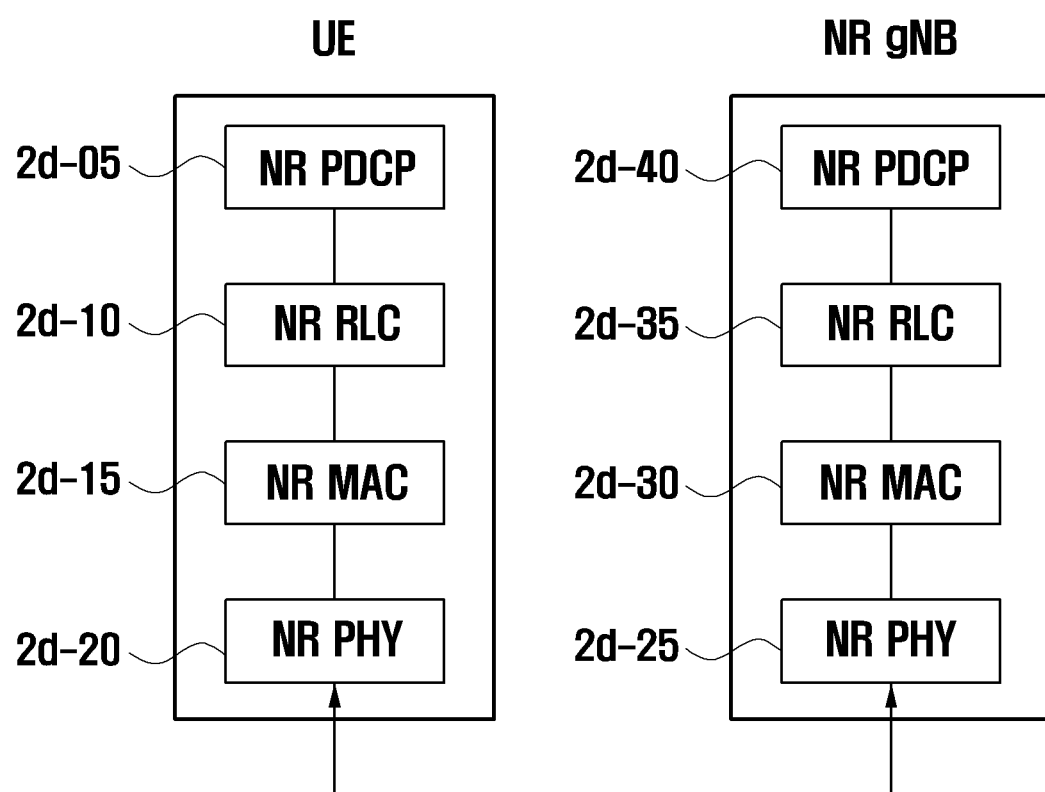
FIG. 2D is a diagram illustrating the radio protocol structure of a next-generation mobile communication system to which the disclosure may be applied.

FIG. 2D is a diagram illustrating the radio protocol structure of a next-generation mobile communication system to which the disclosure may be applied.

Referring to FIG. 2D, the radio protocol of the next-generation mobile communication system is configured with NR PDCPs 2d-05 and 2d-40, NR RLC 2d-10 and 2d-35, and NR MAC 2d-15 and 2d-30 in a UE and an NR base station, respectively. Major functions of the NR PDCP 2d-05, 2d-40 may include some of the following functions.

Header compression and decompression function (Header compression and decompression: ROHC only)

User data transfer function (Transfer of user data)

In-sequence delivery function (In-sequence delivery of upper layer PDUs)

Sequence reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU deletion function (Timer-based SDU discard in uplink.)

In the above description, the reordering function (reordering) of an NR PDCP entity refers to a function of sequentially reordering PDCP PDUs, received from a lower layer, based on a PDCP sequence number (SN), may include a function of delivering data to a higher layer in a reordered sequence, may include a function of recording lost PDCP PDUs by reordering the sequence, may include a function of making a status report on lost PDCP PDUs to the transmission side, and may include a function of requesting the retransmission of lost PDCP PDUs.

Major functions of the NR RLC 2d-10, 2d-35 may include some of the following functions.

Data transfer function (Transfer of upper layer PDUs)

In-sequence delivery function (In-sequence delivery of upper layer PDUs)

Out-of-sequence delivery function (Out-of-sequence delivery of upper layer PDUs)

ARQ function (Error Correction through ARQ)

Concatenation, segmentation and reassembly function (Concatenation, segmentation and reassembly of RLC SDUs)

Re-segmentation function (Re-segmentation of RLC data PDUs)

Sequence reordering function (Reordering of RLC data PDUs)
Duplicate detection function (Duplicate detection)
Error detection function (Protocol error detection)
RLC SDU discard function (RLC SDU discard)
RLC re-establishment function (RLC re-establishment)

In the above description, the in-sequence delivery function of an NR RLC entity refers to a function of delivering RLC SDUs, received from a lower layer, to a higher layer in sequence, and may include a function of reassembling multiple RLC SDUs if one RLC SDU has been originally segmented into the multiple RLC SDUs and received and delivering the reassembled RLC SDU. Furthermore, the NR RLC entity may include a function of reordering received RLC PDUs based on an RLC sequence number (SN) or a PDCP SN, and may include a function of recording lost RLC PDUs by reordering the sequence. Furthermore, the NR RLC entity may include a function of making a status report on lost RLC PDUs to the transmission side, and may include a function of requesting the retransmission of lost RLC PDUs. The NR RLC entity may include a function of delivering, to a higher layer, only RLC SDUs prior to a lost RLC SDU in sequence if the lost RLC SDU is present. Furthermore, the NR RLC entity may include a function of delivering, to a higher layer, all RLC SDUs received before a timer starts in sequence if the timer has expired although there is a lost RLC SDU or may include a function of delivering, to a higher layer, all RLC SDUs received so far if a given timer has expired although there is a lost RLC SDU. Furthermore, the NR RLC entity may include may include a function of processing RLC PDUs in the sequence that they are received (in order of arrival regardless of a sequence, such as a sequence number) and delivering the RLC PDUs to a PDCP entity out of sequence (i.e., out-of sequence delivery). Furthermore, when a segment is received, the NR RLC entity may receive segments stored in a buffer or to be subsequently received, may reconfigure the segments into one complete RLC PDU, may process the RLC PDU, and may deliver the RLC PDU to a PDCP entity. The NR RLC layer may not include a concatenation function. The concatenation function may be performed in the NR MAC layer or may be substituted with the multiplexing function of the NR MAC layer.

In the above description, the out-of-sequence delivery function of the NR RLC entity may refer to a function of directly delivering, to a higher layer, RLC SDUs received from a lower layer out of sequence. Furthermore, the NR RLC entity may include a function of reassembling multiple RLC SDUs if one RLC SDU has been originally segmented into the multiple RLC SDUs and received and delivering the reassembled RLC SDU, and may include a function of storing the RLC SN or PDCP SN of received RLC PDUs, reordering their sequence, and recording lost RLC PDUs.

The NR MAC $2d$-15, $2d$-30 may be connected to multiple NR RLC layer devices configured in one UE. Major functions of the NR MAC may include some of the following functions.

Mapping function (Mapping between logical channels and transport channels)
Multiplexing and demultiplexing function (Multiplexing/demultiplexing of MAC SDUs)
Scheduling information report function (Scheduling information reporting)
HARQ function (Error correction through HARQ)
Priority handling function between logical channels (Priority handling between logical channels of one UE)
Priority handling function between UEs (Priority handling between UEs by means of dynamic scheduling)
MBMS service identification function (MBMS service identification)
Transport format selection function (Transport format selection)
Padding function (Padding)

An NR PHY layer $2d$-20, $2d$-25 may perform an operation of channel-coding and modulating higher layer data, generating the higher layer data into an OFDM symbol, and transmitting the OFDM symbol to a radio channel or demodulating an OFDM symbol received through a radio channel, channel-decoding the OFDM symbol, and transferring the OFDM symbol to a higher layer.

The disclosure proposes methods for a UE to perform carrier aggregation activation without a delay when the UE makes transition from an inactive state to a connected state in a next-generation mobile communication system.

In a network viewpoint, if a UE wants to activate and deactivate a carrier aggregation for the corresponding UE as fast as possible, but the UE makes transition from an inactive state to a connected state, it may be configured based on an operation when making transition from a previous idle state to a connected state. However, in such a case, the UE has to perform all processes of newly reconfiguring a carrier aggregation. This acts as limits to an object of activating a fast carrier aggregation. First, an operation process in an LTE system is described, and a solution is proposed.

Figure 2E:
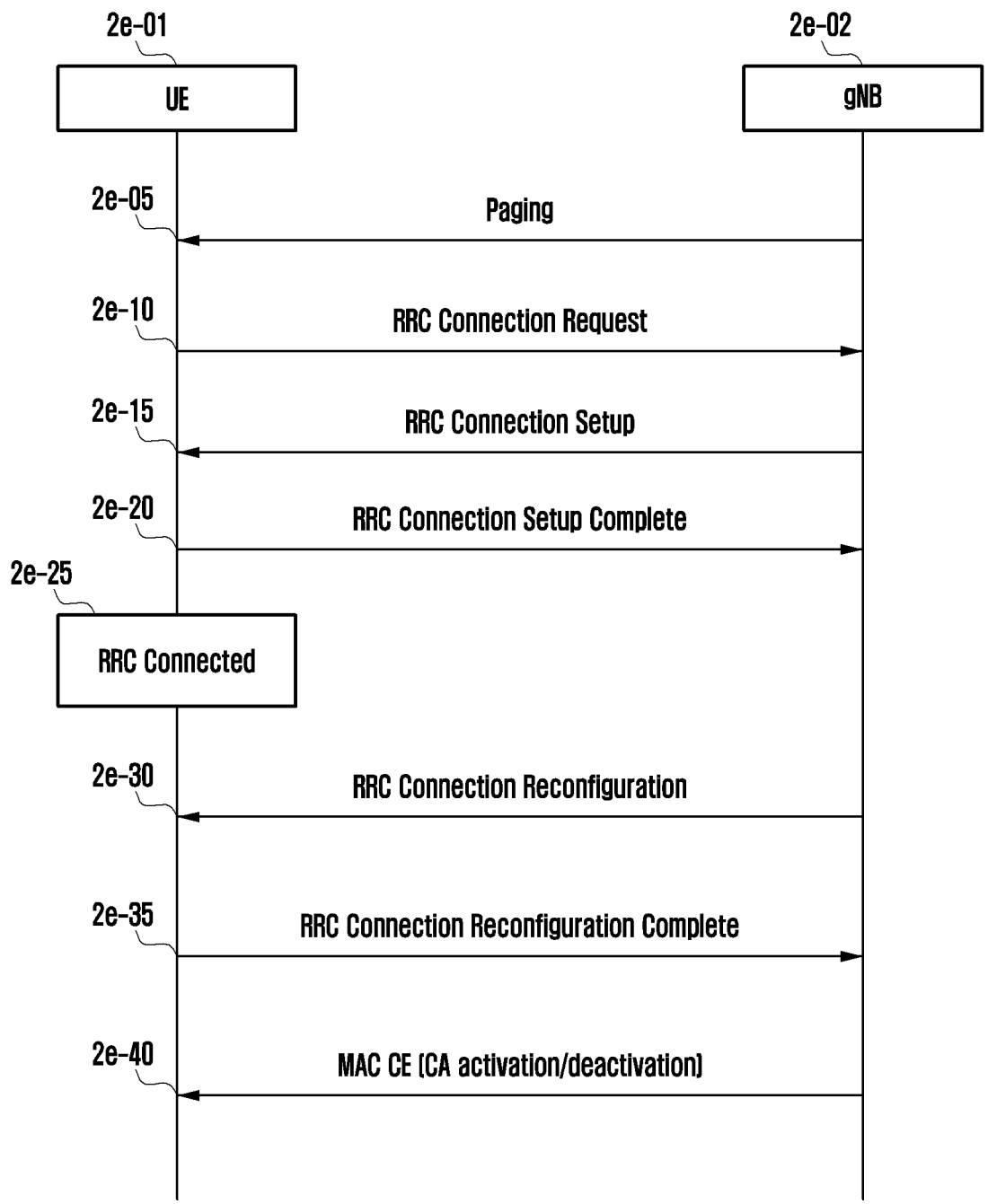
FIG. 2E is a diagram describing an operation for carrier aggregation activation in an LTE system to which reference is made in the disclosure.

FIG. 2E is a diagram describing an operation for carrier aggregation activation in an LTE system to which reference is made in the disclosure.

Referring to FIG. 2e, if downlink data is present, at step $2e$-05, a UE $2e$-01 may receive paging from a base station $2e$-02. Furthermore, at step $2e$-10 to step $2e$-20, the UE $2e$-01 may perform a step for establishing an RRC connection. That is, at step $2e$-10, the UE $2e$-01 may transmit an RRC connection request message to the base station $2e$-02. At step $2e$-15, the UE $2e$-01 may receive an RRC connection setup message from the base station $2e$-02. Furthermore, at step $2e$-20, the UE $2e$-01 may transmit an RRC connection setup complete message to the base station $2e$-02. The step of receiving paging (step $2e$-05) may be omitted if data from the UE $2e$-01 occurs. At step $2e$-25, the UE $2e$-01 makes transition to an RRC connected state through steps $2e$-05 to $2e$-20. Thereafter, the base station $2e$-02 may receive a UE capability from the UE $2e$-01, and may determine whether to configure secondary cells for a carrier aggregation in the corresponding UE. At steps $2e$-30 and $2e$-35, the base station $2e$-02 may indicate a secondary cell configuration for a carrier aggregation in the UE $2e$-01 through an RRC reconfiguration procedure (the transmission and reception of an RRC connection reconfiguration message and an RRC connection reconfiguration complete message). Thereafter, at step $2e$-40, the base station $2e$-02 may determine actually necessary timing among the configured secondary cells, and may transmit, to the UE $2e$-01, an MAC CE indicating the activation of a carrier aggregation.

In a current LTE system, a time delay occurs in activating a carrier aggregation for secondary cells (SCells). In this case, secondary cells are not optimized and configured because a primary serving cell transmits all data before the carrier aggregation is activated in the secondary cell. That is, a UE is not always in an RRC connected state, but may make transition from an idle state to a connected state. In such a case, a carrier aggregation for secondary cells may be additionally applied. In summary, data transmission and reception through a carrier aggregation of secondary cells are performed through the following steps.

1. Downlink or uplink data occurrence
2. A UE makes transition from an idle state to a connected state
3. A base station determines a carrier aggregation for secondary cells
4. Data transmission and reception through a corresponding cell after receiving a carrier aggregation activation signal for a secondary cell
5. The UE makes transition to an idle state (after transition to an inactive state or after the lapse of a given time)

Furthermore, in LTE, a carrier aggregation for secondary cells is configured through an RRC message, and the initial state of the configured cell is set as deactivation (off). A carrier aggregation for a corresponding cell is activated (on) through an MAC CE in which timing necessary for a base station is delivered. A time delay occurs between the transmission of the MAC CE and the occurrence of data transmission and reception after a carrier is actually activated. The time delay is the time taken for the following process.

1. MAC CE transmission delay
2. MAC CE processing time
3. UE RF synchronization and tuning time for a secondary cell
4. Actual transmission If a UE makes transition from an idle state to a connected state, an overall consumption delay time may be much great compared to the listed process. The reason for this is that a process for a UE to receive an RRC reconfiguration message needs to be first included.

Figure 2F:
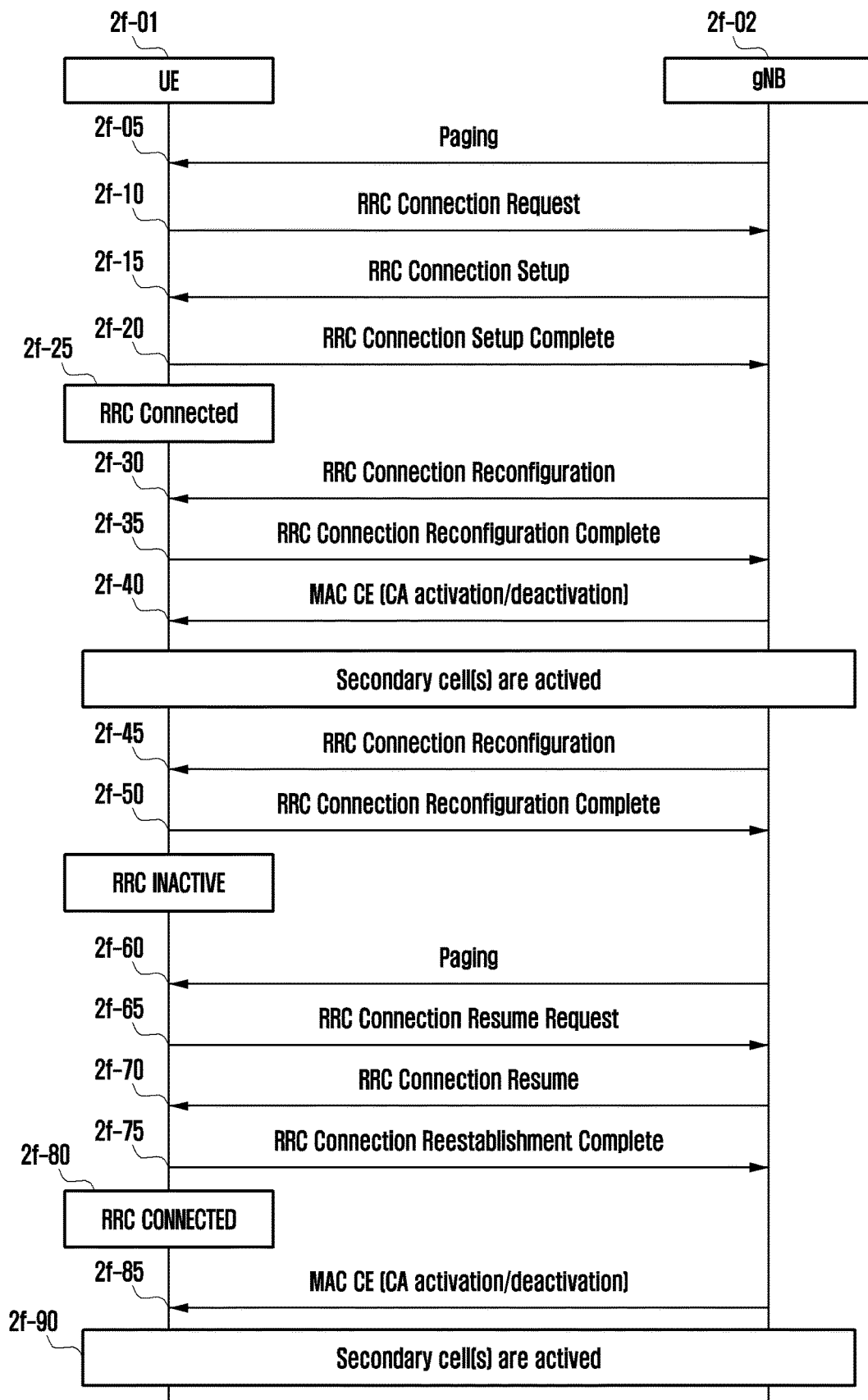
FIG. 2F is a diagram illustrating an operation of performing a carrier aggregation upon transition from an inactive state to a connected state, which is proposed in the disclosure.

FIG. 2F is a diagram illustrating an operation of performing a carrier aggregation upon transition from an inactive state to a connected state, which is proposed in the disclosure.

If a UE is in an inactive state in an LTE or NR system, a method using UE context may be considered. That is, when the UE makes transition to an inactive state, a base station may indicate that the UE should maintain a configuration for a secondary cell. That is, the base station determines that a configuration for which secondary cells has to be maintained, and delivers a corresponding list to the UE. The list may be the same as or different from that of a configuration for secondary cells that the UE has received from the base station in a connected state. That is, the base station may provide a proper secondary cell configuration at timing in which the UE enters an inactive state. The UE that has received the list and entered the inactive state rapidly performs a carrier aggregation to a secondary cell of the configured list if the UE makes transition to a connected state again. As a method therefor, the disclosure proposes two methods below.

1. Option 1
During a resume procedure, a UE performs an operation of actively performing RF synchronization and tuning on all of secondary cells/carriers included in a list configured in an RRC message (RRC connection reconfiguration or RRC connection release) in which a base station indicates transition to an inactive state (e.g., receives paging or stores uplink data in a buffer).
The base station immediately activates a carrier aggregation for a given secondary cell through an MAC CE with respect to the UE that has made transition to the RRC connected state.
2. Option 2
A base station explicitly configures a carrier aggregation for a given secondary cell in a Resume message to indicate that a UE should make transition from an inactive state to a connected state (a secondary cell or multiple candidate secondary cells for which a carrier aggregation will be activated may be included).
The base station immediately activates a carrier aggregation for a given secondary cell through an MAC CE with respect to the UE that has made transition to the RRC connected state.

Both the methods have an advantage in that they can reduce a time delay necessary for corresponding operation because a UE performs the operation of performing RF synchronization and tuning on configured secondary cells. A detailed operation will be described through FIG. 2F.

Referring to FIG. 2F, if downlink data is present, at step 2f-05, a UE 2f-01 may receive paging from a base station 2f-02. Furthermore, at steps 2f-10 to 2f-20, the UE 2f-01 may perform a step for establishing an RRC connection. That is, at step 2f-10, the UE 2f-01 may transmit an RRC connection request message to the base station 2f-02. At step 2f-15, the UE 2f-01 may receive an RRC connection setup message from the base station 2f-02. Furthermore, at step 2f-20, the UE 2f-01 may transmit an RRC connection setup complete message to the base station 2f-02. The step of receiving paging (step 2f-05) may be omitted if data from the UE 2f-01 occurs. At step 2f-25, the UE 2f-01 makes transition to an RRC connected state through steps 2f-05 to 2f-20. Thereafter, the base station 2f-03 receives a UE capability from the UE 2f-01, and may determine whether to configure secondary cells for a carrier aggregation in the corresponding UE. At steps 2f-30 and 2f-35, the base station 2f-03 may indicate a secondary cell configuration for a carrier aggregation in the UE 2f-01 through an RRC reconfiguration procedure (the transmission and reception of an RRC connection reconfiguration message and an RRC connection reconfiguration complete message). For example, it is assumed that setting values for secondary cells Nos. 2, 3, 4, and 5 are included. Thereafter, the base station 2f-02 may determine actually necessary timing among the configured secondary cells, and may transmit, to the UE 2f-01, an MAC CE to indicate the activation of the carrier aggregation at step 2f-40. For example, carrier aggregation activation for the secondary cells Nos. 2, 3, and 4 may be indicated. Thereafter, the configured secondary cells are activated, and data transmission and reception are performed through the corresponding cells.

Thereafter, at step 2f-45, the base station 2f-02 may indicate that the UE 2f-01 should make transition to an inactive state for a cause, such as the absence of downlink data. An RRC connection reconfiguration, an RRC connection release message or a corresponding different RRC message may be used for the indication. For example, the RRC message may include an indication for a configuration that needs to be maintained in secondary cells Nos. 2 and 3. The UE 2f-01 may transmit, to the base station 2f-02, a confirm message (e.g., RRC connection reconfiguration complete message, RRC connection release complete message) for the message at step 2f-50, and may make transition to an inactive state at step 2f-55. Thereafter, at step 2f-60, if downlink data is present, the UE 2f-01 may receive paging from the base station 2f-02. Furthermore, the UE may perform a step for establishing an RRC connection. Accurately, the UE may perform a Resume procedure for transition from an inactive state to a connected state. First, at step 2f-65, the UE 2f-01 transmits a Resume request message (RRC connection resume request message) to the base station 2f-02. At step 2f-70, the UE 2f-01 receives a Resume message (RRC connection resume message) from the base station 2*f*-02. The Resume message may include configuration information for carrier aggregation activation for secondary cells. For example, the Resume message may include carrier aggregation configuration information for a secondary cell No. 2. The information may be different from the information provided by the base station 2*f*-02 at step 2*f*-45. Thereafter, at step 2*f*-75, the UE 2*f*-01 may notify the base station 2*f*-02 of Resume Complete, and may transmit a message to request a connection reconfiguration. An RRC resume complete message or an RRC connection reestablishment complete message or another RRC message including the information may be used for the message.

During the inactive state, the UE 2*f*-01 performs each of the following operations according to the two methods proposed in the disclosure.

1. The UE 2*f*-01 may perform an operation of matching RF synchronization and tuning for the secondary cells configured by the base station 2*f*-02 at step 2*f*-45.

2. The UE 2*f*-01 may perform an operation of matching RF synchronization and tuning for the secondary cells configured by the base station 2*f*-02 at step 2*f*-70.

The UE 2*f*-01 makes transition to the RRC connected state (2*f*-80) through the processes. Thereafter, a carrier aggregation for given secondary cells is activated through the MAC CE to indicate the carrier aggregation activation of the base station 2*f*-02 (step 2*f*-85). At step 2*f*-90, the UE performs data transmission and reception through a corresponding cell.

Figure 2G:
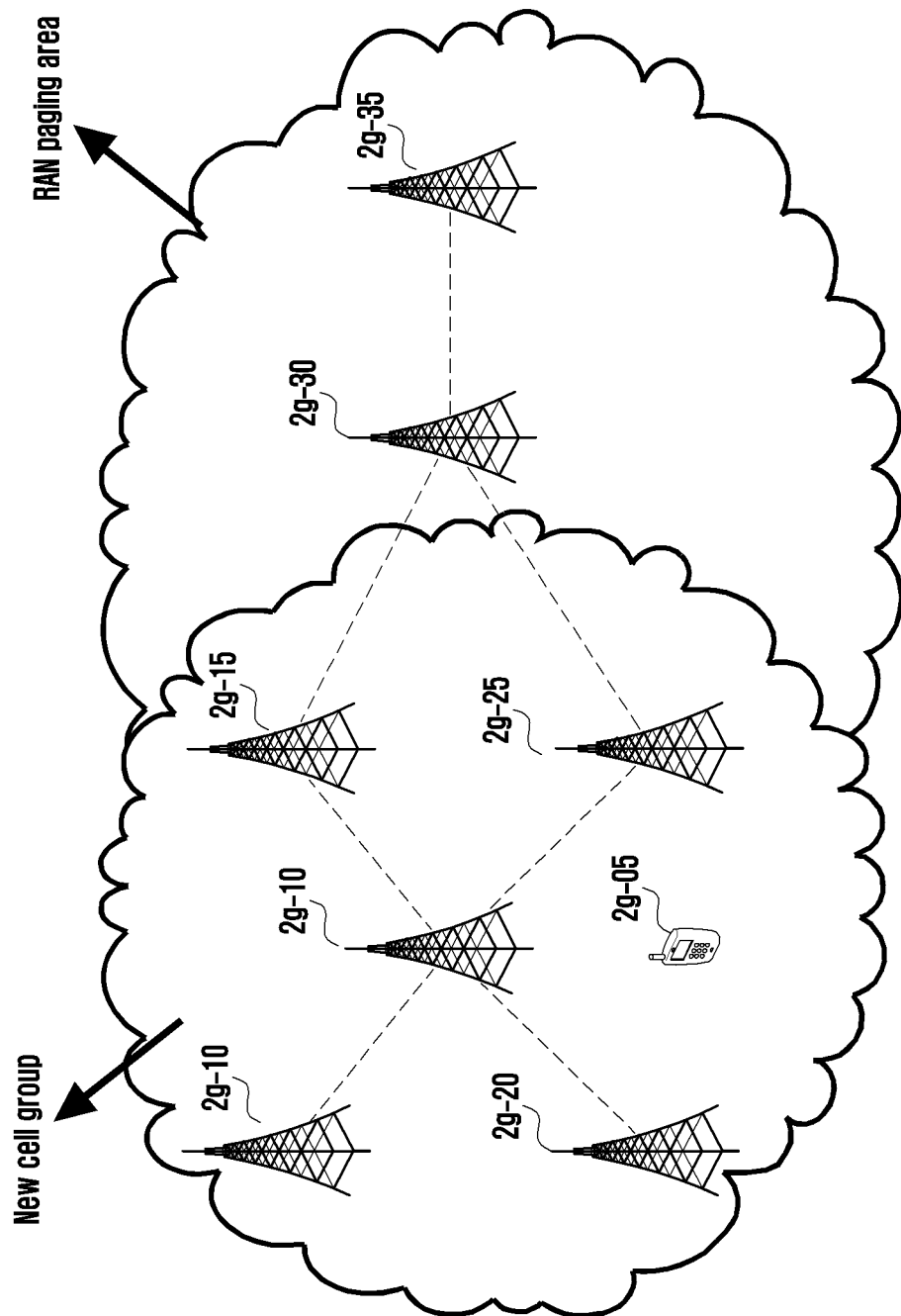
FIG. 2G is a diagram describing a given situation in which a secondary cell configuration is maintained in an inactive state, which is proposed in the disclosure.

FIG. 2G is a diagram describing a given situation in which a secondary cell configuration is maintained in an inactive state, which is proposed in the disclosure.

Basically, when a UE makes transition from an inactive state or idle state to a connected state, although a base station provides a carrier aggregation setting value for a given secondary cell, the UE cannot expect the link characteristic of configured corresponding secondary cells. Accordingly, although the UE applies the configured corresponding secondary cells, performance cannot be guaranteed. In the disclosure, it is assumed that secondary cells configured by a base station are secondary cell present within the base station based on information owned by the base station or configured if performance is guaranteed. Secondary cells will be configured by considering the condition when they are implemented in a network.

A situation to which the disclosure may be applied, that is, a base station capable of configuring a secondary cell for a carrier aggregation may be listed as follows.

1. A base station that configures a secondary cell for a carrier aggregation is a serving cell 2*g*-10 that indicates an inactive state in a UE 2. Base stations 2*g*-10~2*g*-35 present within an RAN paging area 3. Base stations 2*g*-10~2*g*-25 present within a newly defined first cell group The RAN paging area is a set of cells that share the UE context of a UE when the UE operates in an inactive state. A base station present within the corresponding area may indicate transition to a connected state with respect to the UE 2*g*-05 in the inactive state. The first cell group includes a serving cell that indicates the inactive state in the UE, and may include one or more areas smaller than or equal to the RAN paging area. Furthermore, the RAN paging area and the newly defined first cell group need to be a set of cells capable of guaranteeing performance for a fast carrier aggregation activation configuration of the UE. That is, secondary cells configured by the base station include secondary cells present within the base station based on information owned by the base station or include a set of cells configured when performance is guaranteed although a configured carrier aggregation is activated although the UE is connected in a corresponding cell.

Figure 2H:
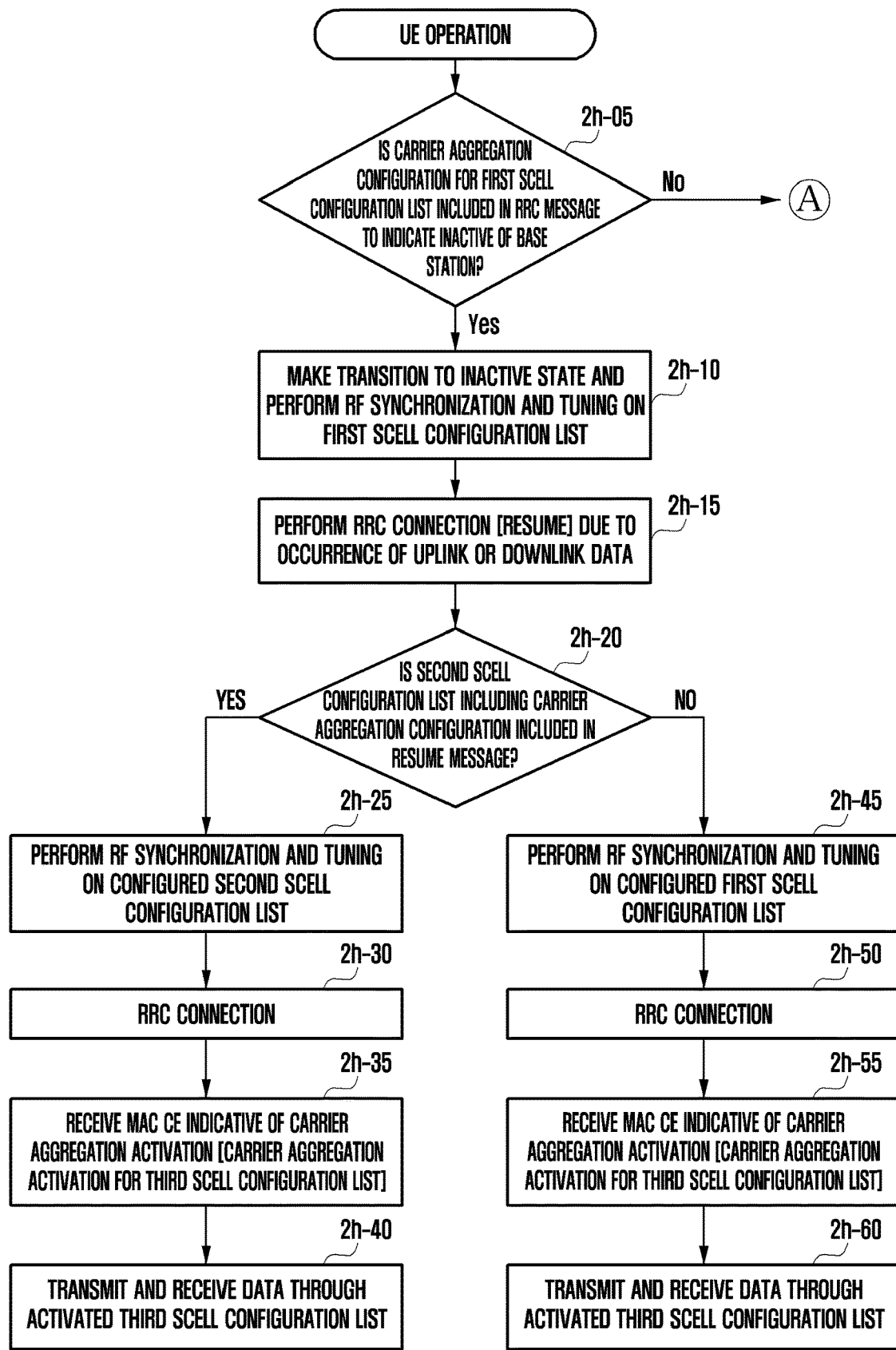
FIG. 2HA is a diagram illustrating the entire operation of a UE to which the disclosure is applied.
Figure 2H:
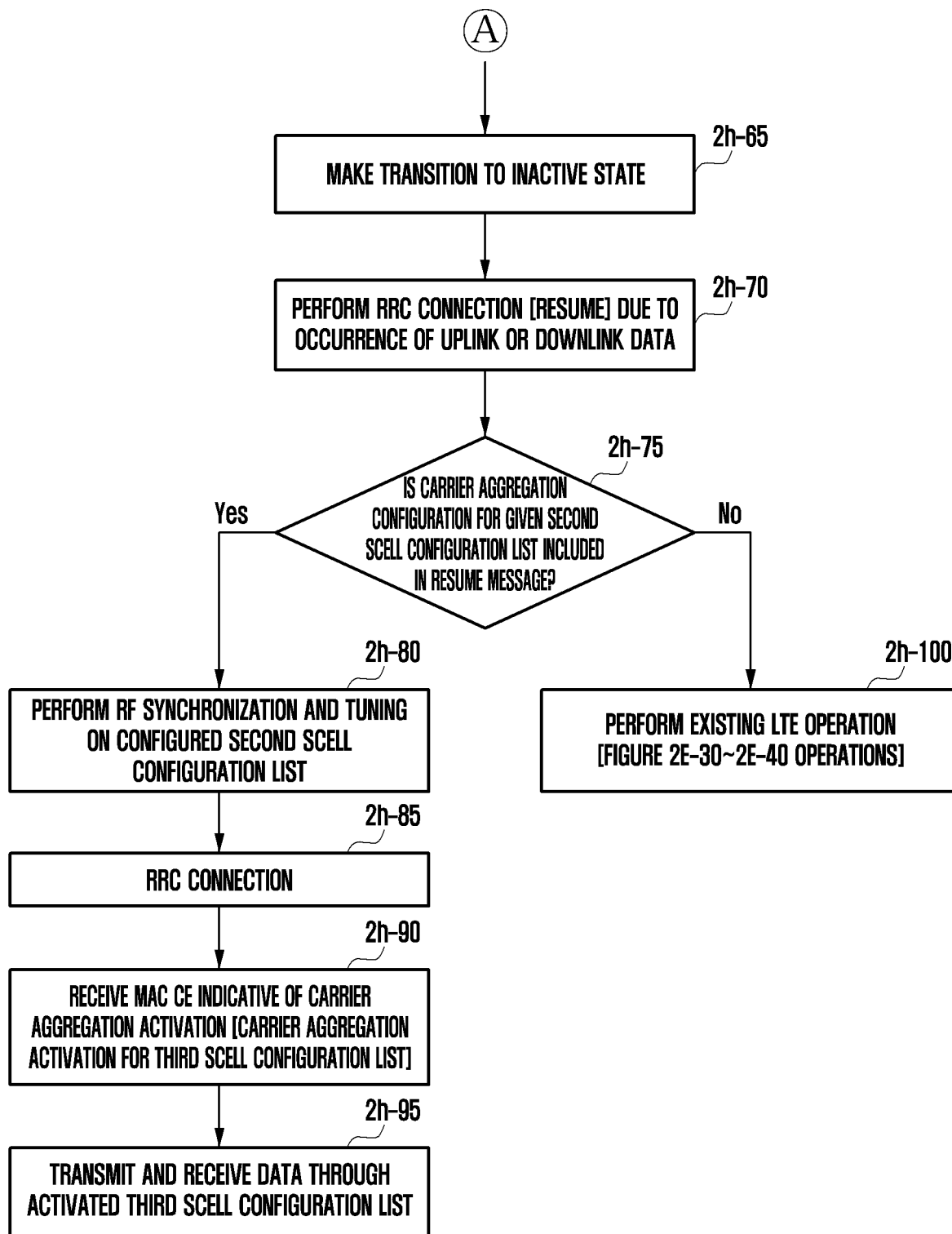

FIG. 2HA is a diagram illustrating the entire operation of a UE to which the disclosure is applied. FIG. 2HB is a diagram illustrating the entire operation of a UE to which the disclosure is applied.

The disclosure has an object of rapidly performing a carrier aggregation upon transition from an inactive state (RRC INACTIVE state) to an RRC connected state, and provides several types of signaling and an operation of a UE that receives the corresponding signaling.

At step 2*h*-05, a UE identifies whether a message in which a base station indicates transition to an inactive state includes a first SCell configuration list to indicate a carrier aggregation configuration. The first SCell configuration list is a message included in an RRC message to indicate deactivation, and indicates that a UE should perform an RF synchronization and tuning operation on an SCell for a configured list even after the UE makes transition to an inactive state. If the message includes the first SCell configuration list, at step 2*h*-10, the UE makes transition to an inactive state and performs an RF synchronization and tuning operation on configured SCells. Thereafter, at step 2*h*-15, the UE performs an RRC connection with the base station, that is, a Resume operation, for a cause of the occurrence of uplink or downlink data. The operation is performed when the base station transmits an RRC Resume message or an RRC reestablishment message. At step 2*h*-20, the UE identifies whether a second SCell configuration list including a carrier aggregation configuration for a given SCell has been included in the message. The second SCell configuration list may be the same as or different from the first SCell configuration list. If the second SCell configuration list is present, at step 2*h*-25, the UE performs an RF synchronization and tuning operation on cells included in the corresponding SCell list. Thereafter, at step 2*h*-30, the UE makes transition to an RRC connected state. At step 2*h*-35, the UE may receive, from the base station, a MAC CE including a third SCell configuration list for carrier aggregation activation. Furthermore, at step 2*h*-40, the UE activates a corresponding cell and performs data transmission and reception. If the second SCell configuration list is not present in the message to indicate an RRC connection or Resume at step 2*h*-20, at step 2*h*-45, the UE performs an RF synchronization and tuning operation on cells included in the first SCell configuration list received at step 2*h*-05. Thereafter, at step 2*h*-50, the UE makes transition to an RRC connected state. At step 2*h*-55, the UE may receive, from the base station, a MAC CE including a third SCell configuration list for carrier aggregation activation. Furthermore, at step 2*h*-60, the UE activates a corresponding cell and performs data transmission and reception.

If the first SCell configuration list is not present in the RRC message to indicate deactivation at step 2*h*-05, at step 2*h*-65, the UE makes transition to an inactive state. At step 2*h*-70, the UE performs an RRC connection with the base station, that is, a Resume operation, for a cause of the occurrence of uplink or downlink data. The operation is performed when the base station transmits an RRC Resume message or an RRC re-establishment message. At step 2*h*-75, the UE identifies whether a second SCell configuration list including a carrier aggregation configuration for a given SCell has been included in the message. If the second SCell configuration list is present, at step 2*h*-80, the UE performs an RF synchronization and tuning operation on cells included in the corresponding SCell list. Thereafter, at step 2h-85, the UE makes transition to an RRC connected state. At step 2h-90, the UE may receive, from the base station, an MAC CE including a third SCell configuration list for carrier aggregation activation. Furthermore, at step 2h-95, the UE activates a corresponding cell and performs data transmission and reception. If the second SCell configuration list is not present in the message to indicate an RRC connection or Resume at step 2h-75, at step 2h-100, the UE performs the existing operation in LTE. That is, the base station receives a Reconfiguration message again from the UE. The UE receives a configuration for an SCell, receives an MAC CE to indicate the activation of the corresponding SCell, performs RF synchronization and tuning, and then performs data transmission along with corresponding cells (steps 2e-30~2e-40).

Figure 2I:
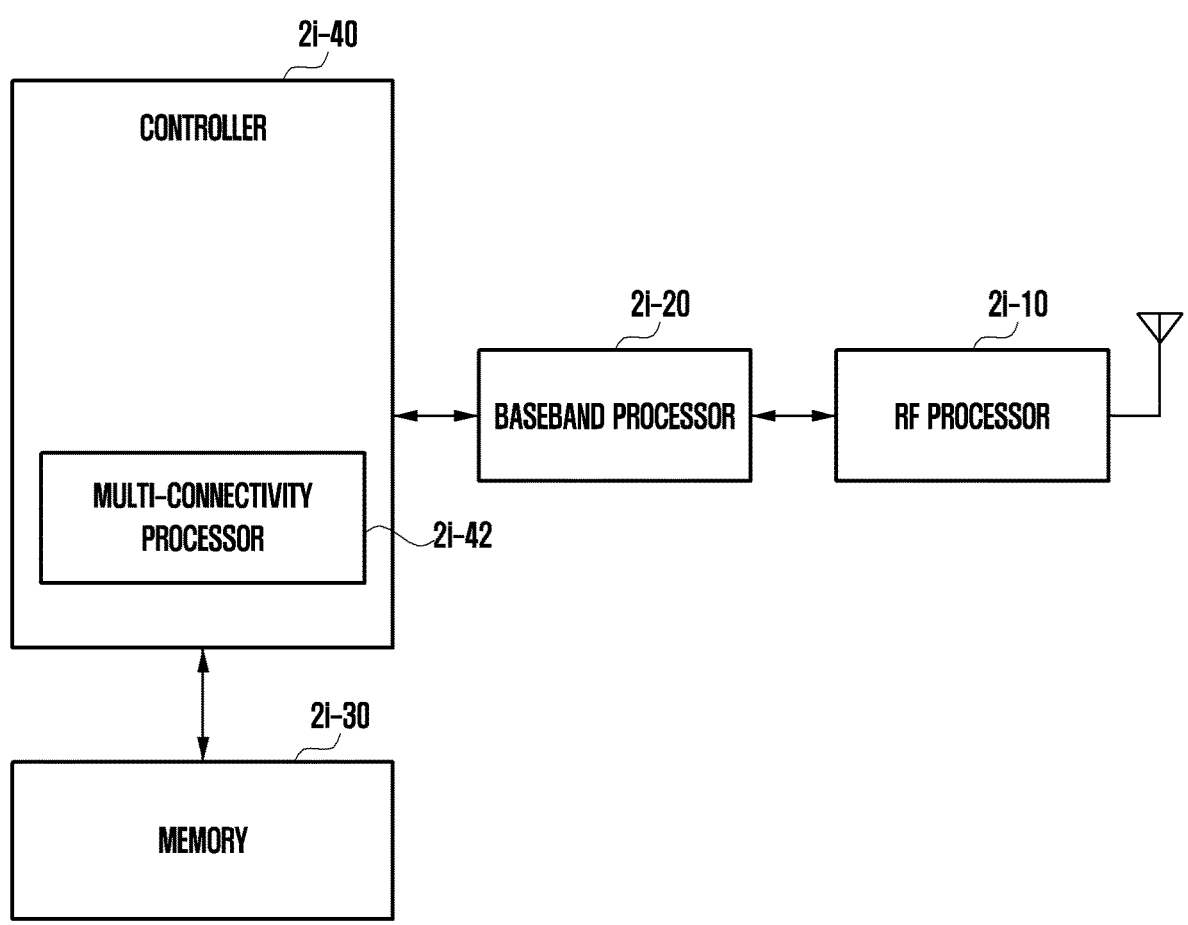
FIG. 2I is a block diagram illustrating an internal structure of a UE to which the disclosure has been applied.

FIG. 2I is a block diagram illustrating an internal structure of a UE to which the disclosure has been applied.

Referring to the figure, the UE includes a radio frequency (RF) processor 2i-10, a baseband processor 2i-20, a memory 2i-30, and a controller 2i-40.

The RF processor 2i-10 performs a function for transmitting and receiving signals through a radio channel, such as the band conversion, amplification, etc. of a signal. That is, the RF processor 2i-10 up-converts a baseband signal received from the baseband processor 2i-20 into an RF band signal, transmits the RF band signal through an antenna, and down-converts an RF band signal received through the antenna into a baseband signal. For example, the RF processor 2i-10 may include a transmission filter, a reception filter, an amplifier, a mixer, an oscillator, a digital to analog convertor (DAC), and an analog to digital convertor (ADC). In FIG. 2I, only one antenna has been illustrated, but the UE may include multiple antennas. Furthermore, the RF processor 2i-10 may include multiple RF chains. Furthermore, the RF processor 2i-10 may perform beamforming. For the beamforming, the RF processor 2i-10 may adjust the phase and size of each of signals transmitted/received through multiple antennas or antenna elements. Furthermore, the RF processor may perform MIMO. When the RF processor performs the MIMO operation, it may receive multiple layers.

The baseband processor 2i-20 performs a baseband signal and inter-bit stream conversion function based on the physical layer standard of a system. For example, when data is transmitted, the baseband processor 2i-20 generates complex symbols by coding and modulating a transmission bit stream. Furthermore, when data is received, the baseband processor 2i-20 reconstructs a reception bit stream from a baseband signal received from the RF processor 2i-10 through demodulation and decoding. For example, if an orthogonal frequency division multiplexing (OFDM) scheme is applied, when data is transmitted, the baseband processor 2i-20 generates complex symbols by coding and modulating a transmission bit stream, maps the complex symbols to subcarriers, and then configures OFDM symbols through an inverse fast Fourier transform (IFFT) operation and cyclic prefix (CP) insertion. Furthermore, when data is received, the baseband processor 2i-20 segments a baseband signal received from the RF processor 2i-10 in an OFDM symbol unit, reconstructs signals mapped to subcarriers through a fast Fourier transform (FFT) operation, and reconstructs a reception bit stream through demodulation and decoding.

The baseband processor 2i-20 and the RF processor 2i-10 transmit and receive signals as described above. Accordingly, the baseband processor 2i-20 and the RF processor 2i-10 may be called a transmitter, a receiver, a transceiver or a communication unit. Furthermore, at least one of the baseband processor 2i-20 and the RF processor 2i-10 may include multiple communication modules in order to support different multiple radio access technologies. Furthermore, at least one of the baseband processor 2i-20 and the RF processor 2i-10 may include different communication modules in order to process signals of different frequency bands. For example, the different radio access technologies may include a wireless LAN (e.g., IEEE 802.11), a cellular network (e.g., LTE), etc. Furthermore, the different frequency bands may include a super high frequency (SHF) (e.g., 2 NRHz, NRhz) band and a millimeter wave (e.g., 60 GHz) band.

The memory 2i-30 stores data, such as a basic program, an application program, and configuration information for the operation of the UE. In particular, the memory 2i-30 may store information related to a second access node that performs wireless communication using a second radio access technology. The memory 2i-30 provides stored data in response to a request from the controller 2i-40.

The controller 2i-40 controls an overall operation of the UE. For example, the controller 2i-40 transmits/receives a signal through the baseband processor 2i-20 and the RF processor 2i-10. Furthermore, the controller 2i-40 writes data in the memory 2i-40 and reads data from the memory 2i-40. To this end, the controller 2i-40 may include at least one processor. For example, the controller 2i-40 may include a communication processor (CP) performing control for communication and an application processor (AP) controlling a higher layer, such as an application program.

Figure 2J:
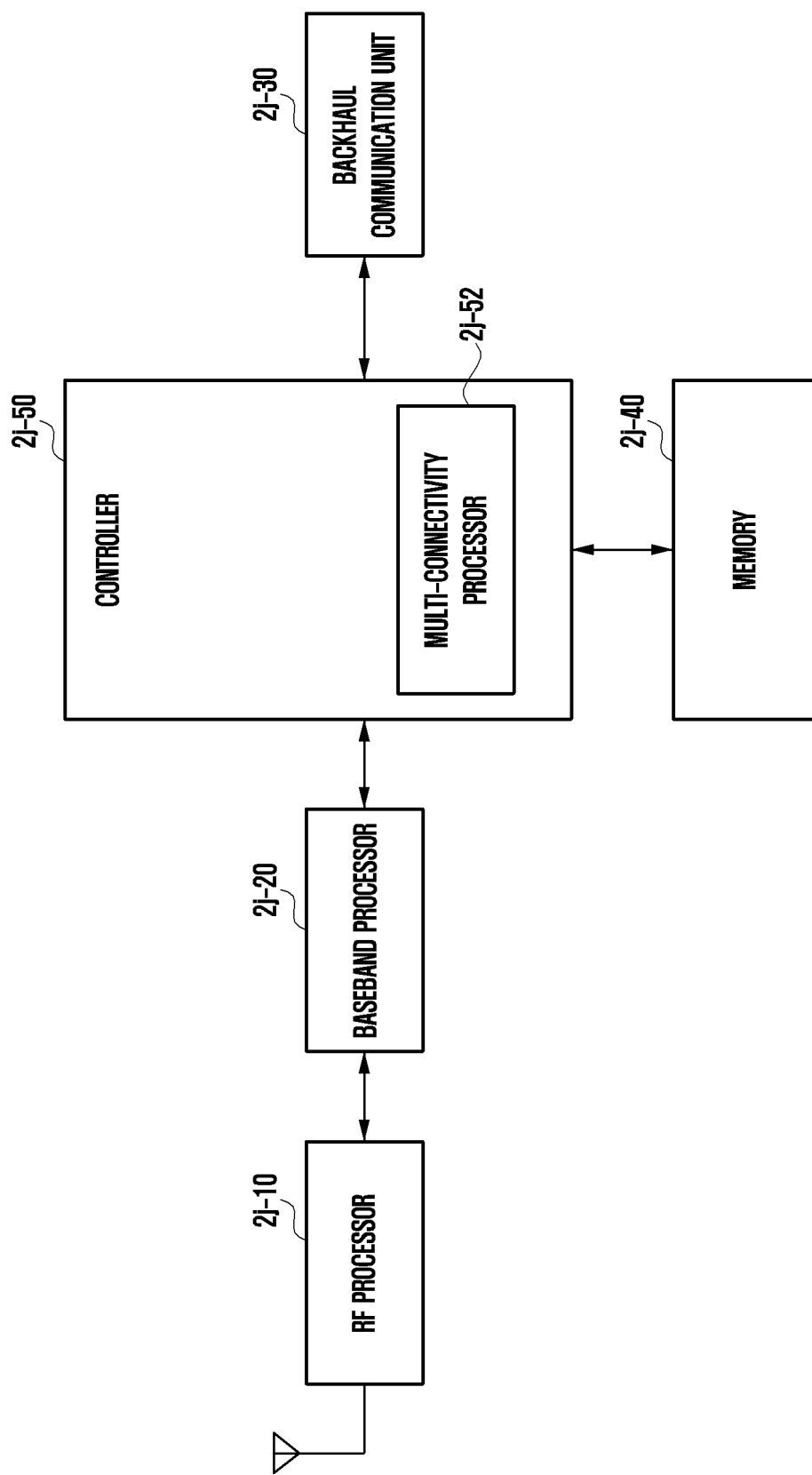
FIG. 2J is a block diagram illustrating the configuration of a base station according to the disclosure.

FIG. 2J is a block diagram illustrating the configuration of a base station according to the disclosure.

As illustrated in the figure, the base station is configured to include an RF processor 2j-10, a baseband processor 2j-20, a backhaul communication unit 2j-30, a memory 2j-40 and a controller 2j-50.

The RF processor 2j-10 performs a function for transmitting and receiving signals through a radio channel, such as the band conversion and amplification of a signal. That is, the RF processor 2j-10 up-converts a baseband signal received from the baseband processor 2j-20 into an RF band signal, transmits the RF band signal through an antenna, and down-converts an RF band signal received through the antenna into a baseband signal. For example, the RF processor 2j-10 may include a transmission filter, a reception filter, an amplifier, a mixer, an oscillator, a DAC, and an ADC. In FIG. 1K, only one antenna has been illustrated, but the first access node may include multiple antennas. Furthermore, the RF processor 2j-10 may include multiple RF chains. Furthermore, the RF processor 2j-10 may perform beamforming. For the beamforming, the RF processor 2j-10 may adjust the phase and size of each of signals transmitted/received multiple antennas or antenna elements. The RF processor may perform a downlink MIMO operation by transmitting one or more layers.

The baseband processor 2j-20 performs a baseband signal and inter-bit stream conversion function based on the physical layer standard of a first radio access technology. For example, when data is transmitted, the baseband processor 2j-20 generates complex symbols by coding and modulating a transmission bit stream. Furthermore, when data is received, the baseband processor 2j-20 reconstructs a reception bit stream from a baseband signal received from the RF processor 2j-10 through demodulation and decoding. For example, if the OFDM scheme is applied, when data is transmitted, the baseband processor 2j-20 generates complex symbols by coding and modulating a transmission bit stream, maps the complex symbols to subcarriers, and configures OFDM symbols through IFFT operation and CP insertion. Furthermore, when data is received, the baseband processor 2j-20 segments a baseband signal received from the RF processor 2j-10 in an OFDM symbol unit, reconstructs signals mapped to subcarriers through FFT operation, and then reconstructs a reception bit stream through demodulation and decoding. The baseband processor 2j-20 and the RF processor 2j-10 transmit and receive signals as described above. Accordingly, the baseband processor 2j-20 and the RF processor 2j-10 may be called a transmitter, a receiver, a transceiver, a communication unit or a wireless communication unit.

The backhaul communication unit 2j-30 provides an interface for performing communication with other nodes within a network. That is, the backhaul communication unit 2j-30 physically converts a bit stream, transmitted from a primary base station to another node, for example, a secondary base station, a core network, etc., into a physical signal, and converts a physical signal, received from another node, into a bit stream.

The memory 2j-40 stores data, such as a basic program, an application program, and configuration information for the operation of the base station. Specifically, the memory 2j-40 may store information on a bearer allocated to an accessed UE and measurement results reported by an accessed UE. Furthermore, the memory 2j-40 may store information, that is, a criterion by which whether to provide a UE with multiple connections is determined. Furthermore, the memory 2j-40 provides stored data in response to a request from the controller 2j-50.

The controller 2j-50 controls an overall operation of the primary base station. For example, the controller 2j-50 transmits/receives a signal through the baseband processor 2j-20 and the RF processor 2j-10 or through the backhaul communication unit 2j-30. Furthermore, the controller 2j-50 writes data in the memory 2j-40 and reads data from the memory 2j-40. To this end, the controller 2j-50 may include at least one processor.

The embodiments of the disclosure disclosed in this specification and drawings have suggested given examples in order to easily describe the technical contents of the disclosure and to help understanding of the disclosure, but are not intended to limit the scope of the disclosure. It is evident to a person having ordinary skill in the art to which the disclosure pertains that other modified examples based on the technical spirit of the disclosure are possible in addition to the disclosed embodiments.

The preferred embodiments of the disclosure have been disclosed in this specification and drawings. Although specific terms have been used in this specification and drawings, they are used in common meanings in order to easily describe the technical contents of the disclosure and to help understanding of the disclosure, but are not intended to limit the scope of the disclosure. It is evident to a person having ordinary skill in the art to which the disclosure pertains that other modified examples based on the technical spirit of the disclosure are possible in addition to the disclosed embodiments.

What is claimed is:

1. A method performed by a terminal in a wireless communication system, the method comprising:
    receiving, from a base station, a radio resource control (RRC) message to configure at least one secondary cell (SCell) for the terminal;
    receiving, from the base station, an RRC release message indicating a configuration for an RRC inactive state of the terminal;
    storing configuration information on the at least one SCell for the terminal based on the RRC release message;
    entering the RRC inactive state from an RRC connected state based on the first RRC release message;
    receiving, from the base station, an RRC resume message to resume an RRC connection;
    identifying whether the RRC resume message includes information for a configuration of the at least one SCell;
    maintaining the at least one SCell, in case that the RRC resume message includes the information for the configuration of the at least one SCell; and
    entering the RRC connected state from the RRC inactive state based on the RRC resume message.

2. The method of claim 1,
    wherein the at least one SCell is configured to be in a deactivated state, in case that the RRC connection is resumed, and
    wherein the at least one SCell is activated based on a medium access control (MAC) control element (CE) indicating an activation being received from the base station.

3. The method of claim 1, further comprising:
    transmitting, to the base station, a request message for requesting resumption of the RRC connection,
    wherein the RRC resume message is received in response to the request message.

4. A method performed by a base station in a wireless communication system, the method comprising:
    transmitting, to a terminal, a radio resource control (RRC) message to configure at least one secondary cell (SCell) for the terminal;
    transmitting, to the terminal, an RRC release message indicating a configuration for an RRC inactive state of the terminal; and
    transmitting, to the terminal which enters to the RRC inactive state from an RRC connected state based on the RRC release message, an RRC resume message to resume an RRC connection,
    wherein the RRC release message indicates to store configuration information on the at least one SCell for the terminal,
    wherein the RRC resume message includes information for a configuration of the at least one SCell,
    wherein the at least one SCell is maintained based on the information for the configuration of the at least one SCell, and
    wherein the terminal enters to the RRC connected state from the RRC inactive state based on the RRC resume message.

5. The method of claim 4, further comprising:
    transmitting, to the terminal, a medium access control (MAC) control element (CE) indicating an activation of the at least one SCell,
    wherein the at least one SCell is activated from a deactivated state based on the MAC CE.

6. The method of claim 4, further comprising:
    receiving, from the terminal, a request message for requesting resumption of the RRC connection,
    wherein the RRC resume message is transmitted in response to the request message.

7. A terminal in a wireless communication system, the terminal comprising:
a transceiver; and
a controller configured to:
receive, via the transceiver from a base station, a radio resource control (RRC) message to configure at least one secondary cell (SCell) for the terminal,
receive, via the transceiver from the base station, an RRC release message indicating a configuration for an RRC inactive state of the terminal,
store configuration information on the at least one SCell for the terminal based on the RRC release message,
enter the RRC inactive state from an RRC connected state based on the RRC release message,
receive, via the transceiver from the base station, an RRC resume message to resume an RRC connection,
identify whether the RRC resume message includes information for a configuration of the at least one SCell,
maintain the at least one SCell, in case that the RRC resume message includes the information for the configuration of the at least one SCell, and
enter the RRC connected state from the RRC inactive state based on the RRC resume message.

8. The terminal of claim 7,
wherein the at least one SCell is configured to be in a deactivated state, in case that the RRC connection is resumed, and
wherein the controller is further configured to activate the at least one SCell based on a medium access control (MAC) control element (CE) indicating an activation being received from the base station.

9. The terminal of claim 7,
wherein the controller is further configured to transmit, via the transceiver to the base station, a request message for requesting resumption of the RRC connection, and
wherein the RRC resume message is received in response to the request message.

10. A base station in a wireless communication system, the base station comprising:
a transceiver; and
a controller configured to:
transmit, via the transceiver to a terminal, a radio resource control (RRC) message to configure at least one secondary cell (SCell) for the terminal,
transmit, via the transceiver to the terminal, an RRC release message indicating a configuration for an RRC inactive state of the terminal, and
transmit, via the transceiver to the terminal which enters to the RRC inactive state from an RRC connected state based on the RRC release message, an RRC resume message to resume an RRC connection,
wherein the RRC release message indicates to store configuration information on the at least one SCell for the terminal,
wherein the RRC resume message includes information for a configuration of the at least one SCell,
wherein the at least one SCell is maintained based on the information for the configuration of the at least one SCell, and
wherein the terminal enters RRC connected state from the RRC inactive state based on the RRC resume message.

11. The base station of claim 10,
wherein the controller is further configured to transmit, via the transceiver to the terminal, a medium access control (MAC) control element (CE) indicating an activation of the at least one SCell, and
wherein the at least one SCell is activated from a deactivated state based on the MAC CE.

12. The base station of claim 10,
wherein the controller is further configured to receive, via the transceiver from the terminal, a request message for requesting resumption of the RRC connection, and
wherein the RRC resume message is transmitted in response to the request message.

* * * * *

UNITED STATES PATENT AND TRADEMARK OFFICE
CERTIFICATE OF CORRECTION

| | | |
|---|---|---|
| PATENT NO. | : 11,751,271 B2 | Page 1 of 1 |
| APPLICATION NO. | : 17/715839 | |
| DATED | : September 5, 2023 | |
| INVENTOR(S) | : Seungri Jin et al. | |

It is certified that error appears in the above-identified patent and that said Letters Patent is hereby corrected as shown below:

In the Claims

Column 34, Claim 1, Line 7, "the first RRC release message" should read --the RRC release message--.

Signed and Sealed this
Sixteenth Day of July, 2024

Katherine Kelly Vidal
Director of the United States Patent and Trademark Office